United States Patent
McNeill et al.

(10) Patent No.: US 12,380,280 B2
(45) Date of Patent: Aug. 5, 2025

(54) TOPIC IDENTIFICATION BASED ON VIRTUAL SPACE MACHINE LEARNING MODELS

(71) Applicant: Salesforce, Inc., San Francisco, CA (US)

(72) Inventors: Mitchell McNeill, Dallas, TX (US); Neil Brady, Indianapolis, IN (US); Nathan Smith, Denver, CO (US)

(73) Assignee: Salesforce, Inc., San Francisco, CA (US)

( * ) Notice: Subject to any disclaimer, the term of this patent is extended or adjusted under 35 U.S.C. 154(b) by 286 days.

(21) Appl. No.: 17/946,952

(22) Filed: Sep. 16, 2022

(65) Prior Publication Data

US 2024/0095459 A1  Mar. 21, 2024

(51) Int. Cl.
  *G06F 40/35*  (2020.01)
  *G10L 25/30*  (2013.01)
  *H04L 51/02*  (2022.01)

(52) U.S. Cl.
  CPC .............. *G06F 40/35* (2020.01); *G10L 25/30* (2013.01); *H04L 51/02* (2013.01)

(58) Field of Classification Search
  None
  See application file for complete search history.

(56) References Cited

U.S. PATENT DOCUMENTS 6,675,159 B1 * 1/2004 Lin ...................... G06F 40/205
11,140,115 B1 * 10/2021 Lukacs ................. H04L 51/42
11,228,541 B1 * 1/2022 Rubadeau ............... H04L 51/42
2018/0287982 A1   10/2018 Draeger et al.
2022/0108195 A1 *  4/2022 Kehler ................... G06V 10/82

OTHER PUBLICATIONS

David Auerbach, "Re-Animator. How Stewart Butterfield created Flickr and Slack out of the ashes of failed projects" online retrieved May 9, 2019. Retrieved from the Internet: <URL: https://slate.com/business/2014/05/stewart-butterfield-flickr-and-slack-how-he-snatched-victory-from-the-jaws-of-defeat.html> 12 pages. (dated May 28, 2014, 2:48 PM).

(Continued)

*Primary Examiner* — Nicole A K Schmieder
(74) *Attorney, Agent, or Firm* — Lee & Hayes, P.C.

(57) ABSTRACT

Techniques for displaying workflow responses based on determining topics associated with user requests are discussed herein. In some examples, a user may post a request (e.g., question) to a virtual space (e.g., a channel, thread, board, etc.) of a communication platform. The communication platform may input the request into a machine learning model trained to identify topics associated with the request and confidence levels associated with topics. In such examples, the communication platform may associate a topic with the user request based on the confidence level of the topic. In some examples, the communication platform may determine that the topic is associated with a graphical identifier (e.g., emoji). The communication platform may cause the graphical identifier to be displayed to the virtual space within which the user request was posted. In response to displaying the graphical identifier, the communication platform may display a workflow response to the virtual space.

20 Claims, 12 Drawing Sheets

(56) References Cited

OTHER PUBLICATIONS

Michael Carney, "Slack is thriving on a cocktail of whimsy and great timing", Pandodaily, Lexisnexis, https://advance.lexis.com/api/permalink/dd2d4ee5-2ddf-4d3a-a1d9-3bcee5e38b74/?context=1000516, (dated Feb. 6, 2015, 2:12 AM) 4 pages.
"Die, Email, Die! a Flickr Cofounder Aims to Cut Us All Some Slack", Readwriteweb, Lexisnexis, https://advance.lexis.com/api/permalink/33dd79e2-90f5-409d-ae27-5a2c7e86bf31/?context=1000516>. (dated Aug. 14, 2013, 4:15 PM) 3 pages.
Robert Hof, "Stewart Butterfield on How Slack Became a $2.8 Billion Unicorn", Forbes, [online] [retrieved May 9, 2019]. Retrieved from the Internet: <URL: https://www.forbes.com/sites/roberthof/2015/06/02/stewart-butterfield-on-how-slack-became-a-2-8-billion-unicorn-2/#7c31937d7d9c>. (dated Jun. 2, 2015, 3;25 PM), 4 pages.
"How Slack changed the way we work by putting the customer experience first", Repeat Customer Podcast, Episode 3, [online][retrieved May 9, 2019]. Retrieved from the Internet: <URL: https://www.zendesk.com/resources/slack-customer-experience/, (2019) 16 pages.
Matthew Ingram, "Flickr co-founder launches Slack, an all-in-one messaging tool designed to kill email forever", Gigaom, Lexisnexis, https://advance.lexis.com/api/permalink/0b676b7c-aec3-4560-861e-d030d1dd008c/?context=1000516, (dated Feb. 12, 2014, 7:03 PM), 3 pages.
Internet Relay Chat, Wikipedia, [online][retrieved May 30, 2019]. Retrieved from the Internet: <URL: https://en.wikipedia.org/wiki/Internet_Relay_Chat> (dated May 28, 2019) 21 pages.
Mike Issac, "Slack, a Start-Up With an App to Foster Business Collaboration, Is Valued at $1.1 Billion", The New York Times Blogs (BITS), Lexisnexis, https://advance.lexis.com/api/permalink/3eb84b34-a8f9-4d7d-9573-89d9598a4963/?context=1000516>(dated Oct. 31, 2014) 3 pages.
Adrienne LaFrance, "The Triumph of Email", Atlantic Online, Lexisnexis, https://advance.lexis.com/api/permalink/32d7ddd9-d4c1-4a73-86f7-08ab5842fde6/?context=1000516, (dated Jan. 6, 2016) 6 pages.
Matsumoto, T. et al., "Chocoa Communicator—A New Communication System Based on Awareness and Text Communications", Fujitsu Sci. Tech. J., 36, 2, (Dec. 2000) pp. 154-161.
Oikarinen, J. & Reed, D., "Internet Relay Chat Protocol", Request for Comments: 1459, Network Working Group, [online][retrieved May 30, 2019]. Retrieved from the Internet: <URL: https://www.rfc-editor.org/rfc/rfc1459.txt>. (dated May 1993) 57 pages.
Ernie Smith, "Picking Up The Slack", Tedium, [online][retrieved May 9, 2019]. Retrieved from the Internet: <URL: https://tedium.co/2017/10/17/irc-vs-slack-chat-history/>. (dated Oct. 17, 2017) 8 pages.
The Big Pivot w/ Slack's Stewart Butterfield, Masters of Scale Podcast, Episode 13 (Aired Nov. 14, 2017), https://mastersofscale.com/#/stewart-butterfield-the-big-pivot/, (dated Jan. 17, 2018) 21 pages.
Jonathan Vanian, "Why these startups think chat apps are the next big thing in workplace collaboration", Gigaom, Lexisnexis, https://advance.lexis.com/api/permalink/e83778c8-09c8-43aa-9ba0-88526283de69/?context=1000516, (dated Aug. 1, 2014, 5:45 PM) 4 pages.
Rebecca Walberg, "Email biggest office waste of time: survey", National Post, at FP10, Lexisnexis, https://advance.lexis.com/api/permalink/96268e3f-26ad-48ac-a98f-6c39804ebded/?context=1000516, (dated Mar. 4, 2014) 3 pages.

\* cited by examiner

TOPIC IDENTIFICATION BASED ON VIRTUAL SPACE MACHINE LEARNING MODELS

TECHNICAL FIELD

Communication platforms are becoming increasingly more popular for organizations to facilitate work related communications. Users of such communication platforms can communicate with other users via channels, direct messages, and/or other virtual spaces. In some examples, users may utilize such channels and/or other virtual spaces to solicit advice and/or assistance from other users. For example, a channel may be established between and among various uses of the communication platform. In some instances, such channels may be designated and used by users to post questions and/or responses in an effort to help solve other user issues. Users of the channel may read and respond to other user questions within the channel. Users are further able to search or scroll through a channel history to find information or answers to previously asked questions. In some examples, responding to such questions in this manner may be inefficient and time consuming to responding users. This may be especially true in the case where there is a voluminous number of posts and questions in the channel history, making it difficult or nearly impossible for a user to find relevant information quickly within the channel.

BRIEF DESCRIPTION OF THE DRAWINGS

The detailed description is described with reference to the accompanying figures. In the figures, the left-most digit of a reference number identifies the figure in which the reference number first appears. The use of the same reference numbers in different figures indicates similar or identical components or features. The figures are not drawn to scale.

FIG. 2B illustrates a user interface for multimedia collaboration sessions within the group-based communication system for certain examples.

FIG. 5B illustrates an example user interface associated with a communication platform, as described herein, for displaying user requests within a virtual space.

DETAILED DESCRIPTION

Figure 1:
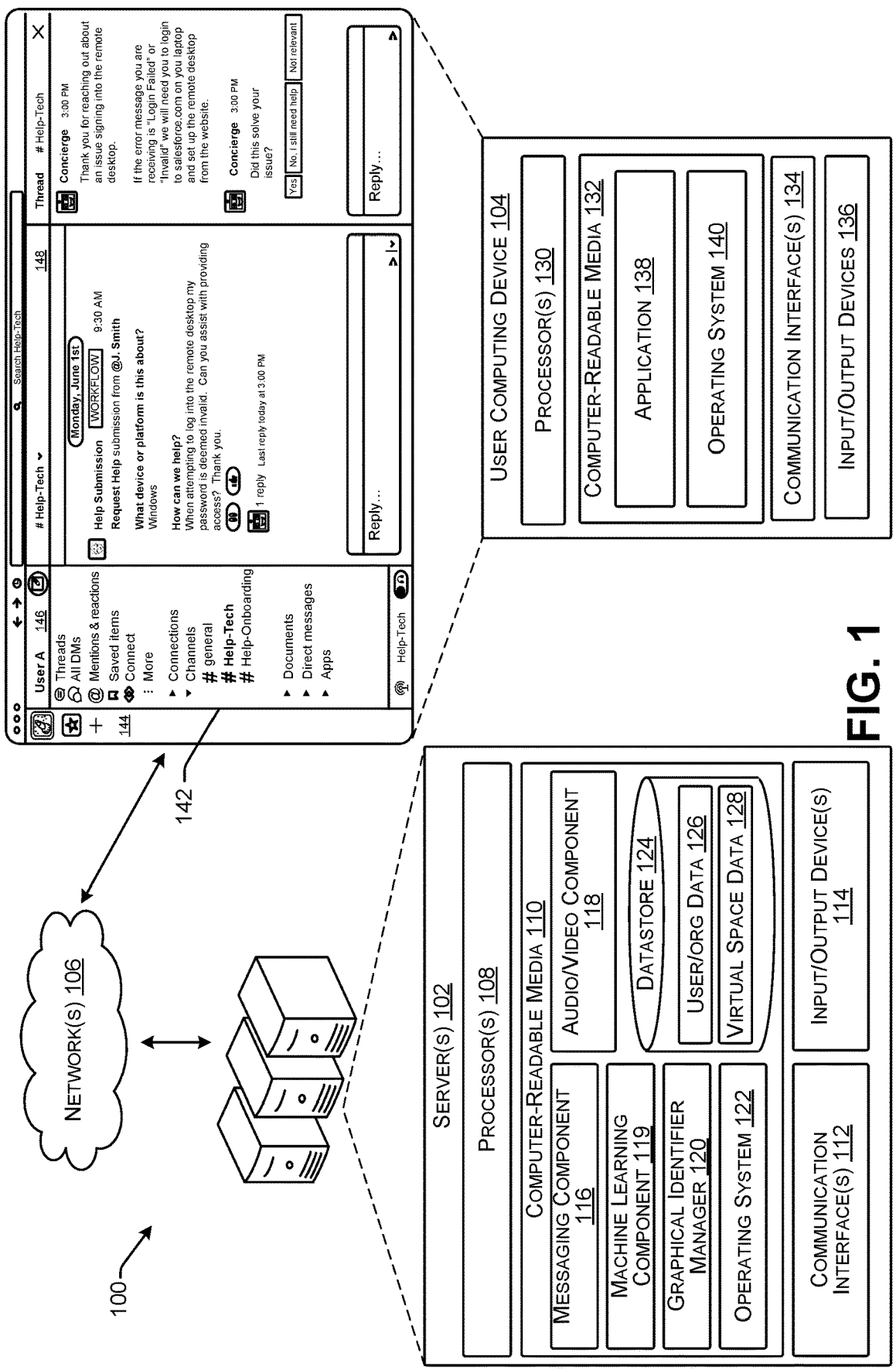
FIG. 1 illustrates an example system for performing techniques described herein.

This disclosure describes techniques for displaying workflow responses based on determining topics associated with user requests. As described herein, machine learning models may be trained and used to determine one or more topics that may be associated with user requests. In some examples, a user may post a request (e.g., question) to a virtual space (e.g., a channel, thread, board, etc.) of a communication platform. The communication platform may input the request into a machine learning model trained to identify topics that may be associated with the request. For example, the communication platform may input the request to the machine learning model and receive, as output from the machine learning model, topics associated with the request, in addition to confidence levels associated with topics. The confidence levels may indicate the degree to which the respective topic is likely to be associated with the request. In such examples, the communication platform may associate an individual topic with the user request based on the confidence level of the individual topic. In some examples, the communication platform may determine that the individual topic is associated with a graphical identifier (e.g., emoji). The communication platform may cause the graphical identifier to be displayed to the virtual space within which the user request was posted. In response to the graphical identifier being posted to the virtual space, the communication platform may display a workflow response to the virtual space. For example, the communication platform may display the workflow response based on determining that a particular workflow response is associated with the posted graphical identifier. As discussed throughout this disclosure, the techniques may improve user experience by enabling quick responses to questions, in addition to limiting work required for virtual space administrators. In addition, such techniques can reduce the use of computing resources by reducing the time and steps spent by administrative users to read, draft, and answer questions within virtual spaces.

As discussed above, in existing technologies, administrative users may be required to read, draft, and respond to questions from a large number of users within a virtual space. In some examples, a user may post a question to a virtual space about which an administrative user may manually (e.g., read the question) determine the topic. Upon determining the topic of the user's question, the administrative user may manually post a graphical identifier (e.g., emoji) to the user's posted question. Based on the specific graphical identifier that was posted, the communication platform may trigger a workflow response (e.g., instructions, answer, etc.) to be displayed to the virtual space for the user. In some examples, users of the virtual space may frequently post similar or identical questions to a virtual space. Further, users may post large volumes of questions and/or requests to a virtual space. Consequently, fully manual reading, drafting, and answering of user questions can be a time-consuming, inefficient, and error-prone technique for answering user inquiries.

To address the technical problems and inefficiencies of manually evaluating user requests, the techniques described herein may include using one or more machine learning models to determine topics associated with user requests. The technical solutions discussed herein solve technical problems associated with the presence of voluminous amounts of information stored in the history of one or more channels in a communication platform.

Initially, the communication platform may receive a request from a user. In some examples, the communication platform can be a group-based communication platform, a channel-based messaging platform and/or any other platform for facilitating communication between and among users. Users of the communication platform may post requests to a virtual space (e.g., channel, thread, board, etc.) within the communication platform. In such examples, users can post requests by composing messages to be posted directly to the virtual space, filling out request forms, submitting tickets, and/or any other similar action. In some examples, users may post requests to particular virtual spaces in order to receive information concerning a particular topic (e.g., post technology related question to a technology related virtual space). Accordingly, certain virtual spaces may be configured to provide responses (e.g., answers, workflow responses, instructions, etc.) regarding certain topics.

In some examples, the communication platform may input the user request to a machine learning model trained to determine one or more topics that may be associated with the user request. In some examples, the communication platform may have one or more machine learning models configured to perform such functions. Further, the communication platform may associate (e.g., assign) one or more machine learning model to be associated with a single virtual space. As such, machine learning models may be trained according to the content and/or topics of the virtual space with which the machine learning model is associated.

In some examples, the machine learning models can be trained to output a plurality of topics associated with user requests, in addition to confidence levels associated with the plurality of topics. For example, a machine learning model may be trained based on interaction data associated with a virtual space. Such interaction data may include previously posted user requests, responses to such requests, user feedback to such responses, and/or topics associated thereto. In some examples, the machine learning models may be re-trained as additional interaction data becomes available. Accordingly, the communication platform and/or virtual space may re-train the one or more machine learning models periodically. Further, machine learning models associated with different virtual spaces may be trained (e.g., and re-trained) at the same or different time as other machine learning models. In some examples, administrative users may determine when to re-train the machine learning models based on a number of factors. Such factors may include how recently the virtual space was created (e.g., newer virtual spaces may be re-trained more frequently than older virtual spaces in order to improve the machine learning model as new training data becomes available), the frequency of requests being made to a virtual space, the number of requests being made, the confidence levels associated with topics output by the machine learning model, user feedback, and/or any other similar factor.

In some examples, the communication platform may input the user request into the trained machine learning model configured to receive, as input, user requests. Further, the machine learning models may be configured to output one or more topics associated with the user request and respective confidence levels associated with the topics. In some examples, the machine learning model may utilize natural language processing to evaluate the user request. Using such natural language processing may enable the machine learning models to evaluate the text of the user request and determine a topic associated therewith. Based on determining that a number of topics may be associated with the user request, the machine learning model may determine a confidence level indicating the degree to which a topic is likely to be associated with the user request. In such examples, the machine learning model may output the identified topics and respective confidence levels to the virtual space of the communication platform.

In some examples, the virtual space may receive, as output from the machine learning model, one or more topics and the respective confidence levels. The virtual space may select the topic from the topics provided by the machine learning model that has the highest confidence level. For example, the virtual space may select an individual topic with the highest confidence level (e.g., the topic most likely to be associated with the request) based on comparing the confidence levels of the respective topics. Based on selecting the topic with the highest confidence level, the virtual space may determine whether the confidence level of the selected topic meets or exceeds a threshold confidence level. In some examples, administrative users may increase or decrease the threshold confidence level based on any number of factors (e.g., the type of virtual space, importance of the content found within the virtual space, etc.). Based on determining that the confidence level associated with the selected topic meets or exceeds the threshold confidence level, the virtual space may associate the topic with the user request.

In some examples, the virtual space may determine whether the topic is associated with a graphical identifier. The virtual space(s) may have a variety of graphical identifiers (e.g., emojis) that may be associated with the one or more topics found within therein. In some examples, the virtual space may identify the graphical identifier associated with the selected topic, and subsequently associate the graphical identifier with the topic. Based on the virtual space associating the graphical identifier with the topic, the virtual space may cause the graphical identifier to be displayed on the virtual space. In some examples, the virtual space may display the graphical identifier proximate to the posted user request. However, this example is not intended to be limiting, the virtual space may display the graphical identifier at any location within the virtual space. In some examples, the virtual space may automatically display (e.g., post) the graphical identifier to the virtual space. Alternatively, an administrative user may manually post the graphical identifier to the user request within the virtual space.

Based on displaying the graphical identifier to the virtual space, the virtual space may cause a response (e.g., workflow response) to be displayed to the virtual space (e.g., the posting of the graphical identifier may trigger a workflow response in the virtual space). In some examples, administrative users of the virtual space may generate responses that are associated (e.g., linked) to particular graphical identifiers. For example, based on the particular graphical identifier displayed to the virtual space, the virtual space may identify a response (e.g., a response generated at a previous time) that is associated with the particular graphical identifier. The response may provide information to the user regarding the user request. Such information may include instructions including how to resolve the request, an answer to the request, and/or any other similar types of information. The response may be displayed within the same or different virtual space. Further, the virtual space may display the response by posting the response directly to the virtual space, or by providing an overlay user interface.

As illustrated by these examples, the techniques described herein can improve the functioning, efficiency, and overall user experience of the communication platform by using machine learning models to determine topics that are associated with user requests which may be used to provide responses to user requests. The machine learning models described herein may improve the efficiency and accuracy of answering user inquiries by removing the need for administrative users to manually read, draft, and respond to each user inquiry. Further, using the machine learning techniques discussed herein, a broad range of user requests may be mapped or otherwise associated with a particular topic, which in turn may trigger a workflow, thereby providing consistent responses and/or instructions to users of a channel, thereby further improving a user experience. Simplifying questions/response interactions may also reduce signaling by and between the communication platform, and may also reduce storage of additional communications.

The following detailed description of examples references the accompanying drawings that illustrate specific examples in which the techniques can be practiced. The examples are intended to describe aspects of the systems and methods in sufficient detail to enable those skilled in the art to practice the techniques discussed herein. Other examples can be utilized and changes can be made without departing from the scope of the disclosure. The following detailed description is, therefore, not to be taken in a limiting sense. The scope of the disclosure is defined only by the appended claims, along with the full scope of equivalents to which such claims are entitled.

Group-Based Communication System

FIG. 1 illustrates an example environment 100 for performing techniques described herein. In at least one example, the example environment 100 can be associated with a communication platform that can leverage a network-based computing system to enable users of the communication platform to exchange data. In at least one example, the communication platform can be "group-based" such that the platform, and associated systems, communication channels, messages, collaborative documents, canvases, audio/video conversations, and/or other virtual spaces, have security (that can be defined by permissions) to limit access to a defined group of users. In some examples, such groups of users can be defined by group identifiers, as described above, which can be associated with common access credentials, domains, or the like. In some examples, the communication platform can be a hub, offering a secure and private virtual space to enable users to chat, meet, call, collaborate, transfer files or other data, or otherwise communicate between or among each other. As described above, each group can be associated with a workspace, enabling users associated with the group to chat, meet, call, collaborate, transfer files or other data, or otherwise communicate between or among each other in a secure and private virtual space. In some examples, members of a group, and thus workspace, can be associated with a same organization. In some examples, members of a group, and thus workspace, can be associated with different organizations (e.g., entities with different organization identifiers).

In at least one example, the example environment 100 can include one or more server computing devices (or "server (s)") 102. In at least one example, the server(s) 102 can include one or more servers or other types of computing devices that can be embodied in any number of ways. For example, in the example of a server, the functional components and data can be implemented on a single server, a cluster of servers, a server farm or data center, a cloud-hosted computing service, a cloud-hosted storage service, and so forth, although other computer architectures can additionally or alternatively be used.

In at least one example, the server(s) 102 can communicate with a user computing device 104 via one or more network(s) 106. That is, the server(s) 102 and the user computing device 104 can transmit, receive, and/or store data (e.g., content, information, or the like) using the network(s) 106, as described herein. The user computing device 104 can be any suitable type of computing device, e.g., portable, semi-portable, semi-stationary, or stationary. Some examples of the user computing device 104 can include a tablet computing device, a smart phone, a mobile communication device, a laptop, a netbook, a desktop computing device, a terminal computing device, a wearable computing device, an augmented reality device, an Internet of Things (IOT) device, or any other computing device capable of sending communications and performing the functions according to the techniques described herein. While a single user computing device 104 is shown, in practice, the example environment 100 can include multiple (e.g., tens of, hundreds of, thousands of, millions of) user computing devices. In at least one example, user computing devices, such as the user computing device 104, can be operable by users to, among other things, access communication services via the communication platform. A user can be an individual, a group of individuals, an employer, an enterprise, an organization, and/or the like.

The network(s) 106 can include, but are not limited to, any type of network known in the art, such as a local area network or a wide area network, the Internet, a wireless network, a cellular network, a local wireless network, Wi-Fi and/or close-range wireless communications, Bluetooth®, Bluetooth Low Energy (BLE), Near Field Communication (NFC), a wired network, or any other such network, or any combination thereof. Components used for such communications can depend at least in part upon the type of network, the environment selected, or both. Protocols for communicating over such network(s) 106 are well known and are not discussed herein in detail.

In at least one example, the server(s) 102 can include one or more processors 108, computer-readable media 110, one or more communication interfaces 112, and/or input/output devices 114.

In at least one example, each processor of the processor(s) 108 can be a single processing unit or multiple processing units, and can include single or multiple computing units or multiple processing cores. The processor(s) 108 can be implemented as one or more microprocessors, microcomputers, microcontrollers, digital signal processors, central processing units (CPUs), graphics processing units (GPUs), state machines, logic circuitries, and/or any devices that manipulate signals based on operational instructions. For example, the processor(s) 108 can be one or more hardware processors and/or logic circuits of any suitable type specifically programmed or configured to execute the algorithms and processes described herein. The processor(s) 108 can be configured to fetch and execute computer-readable instructions stored in the computer-readable media, which can program the processor(s) to perform the functions described herein.

The computer-readable media 110 can include volatile and nonvolatile memory and/or removable and non-removable media implemented in any type of technology for storage of data, such as computer-readable instructions, data structures, program modules, or other data. Such computer-readable media 110 can include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired data and that can be accessed by a computing device. Depending on the configuration of the server(s) 102, the computer-readable media 110 can be a type of computer-readable storage media and/or can be a tangible non-transitory media to the extent that when mentioned, non-transitory computer-readable media exclude media such as energy, carrier signals, electromagnetic waves, and signals per se.

The computer-readable media 110 can be used to store any number of functional components that are executable by the processor(s) 108. In many implementations, these functional components comprise instructions or programs that are executable by the processor(s) 108 and that, when executed, specifically configure the processor(s) 108 to perform the actions attributed above to the server(s) 102. Functional components stored in the computer-readable media can optionally include a messaging component 116, an audio/video component 118, a machine learning component 119, a graphical identifier manager 120, an operating system 122, and a datastore 124.

In at least one example, the messaging component 116 can process messages between users. That is, in at least one example, the messaging component 116 can receive an outgoing message from a user computing device 104 and can send the message as an incoming message to a second user computing device 104. The messages can include direct messages sent from an originating user to one or more specified users and/or communication channel messages sent via a communication channel from the originating user to the one or more users associated with the communication channel. Additionally, the messages can be transmitted in association with a collaborative document, canvas, or other collaborative space. In at least one example, the canvas can include a flexible canvas for curating, organizing, and sharing collections of information between users. In at least one example, the collaborative document can be associated with a document identifier (e.g., virtual space identifier, communication channel identifier, etc.) configured to enable messaging functionalities attributable to a virtual space (e.g., a communication channel) within the collaborative document. That is, the collaborative document can be treated as, and include the functionalities associated with, a virtual space, such as a communication channel. The virtual space, or communication channel, can be a data route used for exchanging data between and among systems and devices associated with the communication platform.

In at least one example, the messaging component 116 can establish a communication route between and among various user computing devices, allowing the user computing devices to communicate and share data between and among each other. In at least one example, the messaging component 116 can manage such communications and/or sharing of data. In some examples, data associated with a virtual space, such as a collaborative document, can be presented via a user interface. In addition, metadata associated with each message transmitted via the virtual space, such as a timestamp associated with the message, a sending user identifier, a recipient user identifier, a conversation identifier and/or a root object identifier (e.g., conversation associated with a thread and/or a root object), and/or the like, can be stored in association with the virtual space.

In various examples, the messaging component 116 can receive a message transmitted in association with a virtual space (e.g., direct message instance, communication channel, canvas, collaborative document, etc.). In various examples, the messaging component 116 can identify one or more users associated with the virtual space and can cause a rendering of the message in association with instances of the virtual space on respective user computing devices 104. In various examples, the messaging component 116 can identify the message as an update to the virtual space and, based on the identified update, can cause a notification associated with the update to be presented in association with a sidebar of user interface associated with one or more of the user(s) associated with the virtual space. For example, the messaging component 116 can receive, from a first user account, a message transmitted in association with a virtual space. In response to receiving the message (e.g., interaction data associated with an interaction of a first user with the virtual space), the messaging component 116 can identify a second user associated with the virtual space (e.g., another user that is a member of the virtual space). In some examples, the messaging component 116 can cause a notification of an update to the virtual space to be presented via a sidebar of a user interface associated with a second user account of the second user. In some examples, the messaging component 116 can cause the notification to be presented in response to a determination that the sidebar of the user interface associated with the second user account includes an affordance associated with the virtual space. In such examples, the notification can be presented in association with the affordance associated with the virtual space.

In various examples, the messaging component 116 can be configured to identify a mention or tag associated with the message transmitted in association with the virtual space. In at least one example, the mention or tag can include an @mention (or other special character) of a user identifier that is associated with the communication platform. The user identifier can include a username, real name, or other unique identifier that is associated with a particular user. In response to identifying the mention or tag of the user identifier, the messaging component 116 can cause a notification to be presented on a user interface associated with the user identifier, such as in association with an affordance associated with the virtual space in a sidebar of a user interface associated with the particular user and/or in a virtual space associated with mentions and reactions. That is, the messaging component 116 can be configured to alert a particular user that they were mentioned in a virtual space.

In at least one example, the audio/video component 118 can be configured to manage audio and/or video communications between and among users. In some examples, the audio and/or video communications can be associated with an audio and/or video conversation. In at least one example, the audio and/or video conversation can include a discrete identifier configured to uniquely identify the audio and/or video conversation. In some examples, the audio and/or video component 118 can store user identifiers associated with user accounts of members of a particular audio and/or video conversation, such as to identify user(s) with appropriate permissions to access the particular audio and/or video conversation.

In some examples, communications associated with an audio and/or video conversation ("conversation") can be synchronous and/or asynchronous. That is, the conversation can include a real-time audio and/or video conversation between a first user and a second user during a period of time and, after the first period of time, a third user who is associated with (e.g., is a member of) the conversation can contribute to the conversation. The audio/video component 118 can be configured to store audio and/or video data associated with the conversation, such as to enable users with appropriate permissions to listen and/or view the audio and/or video data.

In some examples, the audio/video component 118 can be configured to generate a transcript of the conversation, and can store the transcript in association with the audio and/or video data. The transcript can include a textual representation of the audio and/or video data. In at least one example, the audio/video component 118 can use known speech recognition techniques to generate the transcript. In some examples, the audio/video component 118 can generate the transcript concurrently or substantially concurrently with the conversation. That is, in some examples, the audio/video component 118 can be configured to generate a textual representation of the conversation while it is being conducted. In some examples, the audio/video component 118 can generate the transcript after receiving an indication that the conversation is complete. The indication that the conversation is complete can include an indication that a host or administrator associated therewith has stopped the conversation, that a threshold number of meeting attendees have closed associated interfaces, and/or the like. That is, the audio/video component 118 can identify a completion of the conversation and, based on the completion, can generate the transcript associated therewith.

In at least one example, the audio/video component 118 can be configured to cause presentation of the transcript in association with a virtual space with which the audio and/or video conversation is associated. For example, a first user can initiate an audio and/or video conversation in association with a communication channel. The audio/video component 118 can process audio and/or video data between attendees of the audio and/or video conversation, and can generate a transcript of the audio and/or video data. In response to generating the transcript, the audio/video component 118 can cause the transcript to be published or otherwise presented via the communication channel. In at least one example, the audio/video component 118 can render one or more sections of the transcript selectable for commenting, such as to enable members of the communication channel to comment on, or further contribute to, the conversation. In some examples, the audio/video component 118 can update the transcript based on the comments.

In at least one example, the audio/video component 118 can manage one or more audio and/or video conversations in association with a virtual space associated with a group (e.g., organization, team, etc.) administrative or command center. The group administrative or command center can be referred to herein as a virtual (and/or digital) headquarters associated with the group. In at least one example, the audio/video component 118 can be configured to coordinate with the messaging component 116 and/or other components of the server(s) 102, to transmit communications in association with other virtual spaces that are associated with the virtual headquarters. That is, the messaging component 116 can transmit data (e.g., messages, images, drawings, files, etc.) associated with one or more communication channels, direct messaging instances, collaborative documents, canvases, and/or the like, that are associated with the virtual headquarters. In some examples, the communication channel(s), direct messaging instance(s), collaborative document(s), canvas(es), and/or the like can have associated therewith one or more audio and/or video conversations managed by the audio/video component 118. That is, the audio and/or video conversations associated with the virtual headquarters can be further associated with, or independent of, one or more other virtual spaces of the virtual headquarters.

In at least one example, the machine learning component 119 may be configured to determine topics associated with user requests. That is, in at least one example, the machine learning component 119 may be configured to receive a user request and output one or more topics that may be associated with the user request, in addition to confidence levels associated with the topic(s). As described above, each virtual space may use the same or different machine learning models as other virtual spaces. In such examples, the machine learning component 119 may train machine learning models by using training data specific to the virtual space with which the machine learning model will be utilized.

In some examples, the machine learning component 119 may train the machine learning models to determine one or more topics associated with user requests, in addition to determining respective confidence levels associated with the topic(s). The machine learning component 119 may first train machine learning models when a virtual space has been created (e.g., or any time thereafter when a machine learning model is being introduced into a virtual space), in addition to re-training the machine learning models periodically. In some examples, the machine learning component 119 may re-train the machine learning models automatically, or an administrative user may cause the machine learning models to be retrained. Such re-training of the machine learning models may be based on a number of factors. In some examples, factors which contribute to a machine learning model being re-trained may include how recently the virtual space was created (e.g., newer virtual spaces may be re-trained more frequently in order to improve the machine learning model as new training data (e.g., interaction data) becomes available), the frequency of requests being made to a virtual space, the number of requests being made, and/or any other similar factor.

In some examples, the machine learning component 119 may train machine learning models using training data specific to the virtual space with which the machine learning model will be used. For example, the machine learning component 119 may train machine learning models based on interaction data associated with a particular virtual space. Interaction data may include previously posted user requests within the virtual space, responses to such requests, user feedback to the responses, and/or topics associated thereto. Further, interaction data may include confidence levels associated with topics that were determined and/or used at a previous time. In such examples, the machine learning component 119 may use the interaction data as training data in order to learn the relationship between the requests, topics, and/or the confidence levels.

In some examples, the machine learning component 119 configure the machine learning models to receive a user request as input. As such, the machine learning models may be configured to receive, as input, user requests. Further, the machine learning models may be configured to output one or more topics associated with the user request, in addition to respective confidence levels associated with the topic(s). In some examples, the machine learning models may utilize natural language processing to evaluate user requests. Using such natural language processing may enable the machine learning models to evaluate the text of the user request and determine a topic associated therewith. Based on determining a number of topics that may be associated with the user request, the machine learning model may determine a confidence level indicating the degree to which a topic is likely to be associated with the user request. In some examples, the machine learning model may output the identified topics and the respective confidence levels to the virtual space of the communication platform.

Additionally or alternatively, the machine learning component 119 may train machine learning models to determine topics which may be associated with the user request, associate the topic with a graphical identifier, and cause the graphical identifier to be displayed on the virtual space. For example, the machine learning component 119 may train the machine learning models to perform similar functions as described above, in addition to associating the topic with a graphical identifier, and causing the graphical identifier to be displayed to the virtual space.

Additionally or alternatively, the machine learning component 119 may train the machine learning models to output a list of topics to an administrative user. In some examples, the communication platform may instruct (e.g., send a request) the machine learning component 119 to evaluate interaction data of a virtual space and identify one or more topics found therein. In some examples, the interaction data may be the similar or identical to the interaction data described above. Alternatively or additionally, the machine learning component 119 may train the machine learning models to also cluster the topics based on a variety of factors, prioritize the cluster of topics, and output the prioritized list of topics to an administrative user.

In such examples, the machine learning component 119 may train the machine learning models using interaction data, as described above, to determine one or more topics that are being discussed within the virtual space. Based on identifying one or more topics, the machine learning model may determine a cluster of topics based on any number of factors. Such factors may include the frequency with which the topic was posted to the virtual space, the number of times the topic was posted to the virtual space, the importance of the topic (e.g., health related topics may be weighted highly), and/or any other similar factor. Based on the clustered topics, the machine learning model may send the prioritized list of topics to an administrative user. In some examples, the administrative user may use the prioritized list to create responses (e.g., instructions, answers, etc.) for future use.

In some examples, the machine learning model 119 can determine a single topic and can output a graphical indicator (e.g., an emoji) to a virtual space to trigger a workflow, with or without determining a confidence level and/or selecting a topic based on such confidence level(s).

In at least one example, the graphical identifier manager 120 may be configured to select and display graphical identifiers to virtual spaces based on the output of the machine learning models. The graphical identifier manager 120 may receive one or more topics and respective confidence levels as output from the machine learning models. In some examples, the graphical identifier manager 120 may select a single topic from the one or more topics. For example, the graphical identifier manager 120 may compare the confidence levels of the respective topics and select the topic with the highest confidence level (e.g., the topic most likely associated with the request). Based on selecting the topic with the highest confidence level, the graphical identifier manager 120 may determine whether the confidence level of the selected topic meets or exceeds a threshold confidence level. In some examples, administrative users may increase or decrease the threshold confidence level based on any number of factors (e.g., the type of virtual space, importance of the content found within the virtual space, user type or user profile data, etc.). Based on determining that the confidence level associated with the selected topic meets or exceeds the threshold confidence level, the graphical identifier manager 120 may associate the topic with the user request. However, this is not intended to be limiting, the graphical identifier manager 120 may compare the one or more topics to the threshold confidence level and subsequently select the topic with the highest confidence level.

In some examples, the graphical identifier manager 120 may determine that a particular graphical identifier is associated with the selected topic. The graphical identifier manager 120 may have one or more graphical identifiers that are associated (e.g., linked) to various topics. As such, based on the graphical identifier manager 120 selecting a topic, the graphical identifier manager 120 may identify the graphical identifier that is associated with the selected topic. In some examples, the graphical identifier manager 120 may cause the graphical identifier to be displayed to the virtual space.

In some examples, the graphical identifier manager 120 may cause different responses to be displayed based on the differing confidence levels of the selected topic. As described above, the graphical identifier manager 120 may select a topic based on the confidence level associated with the topic. In some examples, the graphical identifier manager 120 may display different responses to the virtual space based on the value of the confidence level. For example, the graphical identifier manager 120 may present a first response based on a high confidence level of the selected topic, and may present a second response (e.g., different from the first response) based on a lower confidence level of the selected topic.

In some examples, the graphical identifier manager 120 may cause a response to be displayed directed toward disambiguating between a plurality of topics. In some examples, the graphical identifier manager 120 may determine that two or more topics have confidence levels above a threshold confidence level. Further, the graphical identifier manager 120 may determine that the difference between the confidence levels of the two or more topics is less than a threshold level of difference. In such examples, the graphical identifier manager 120 may cause a response to be presented to the virtual space in order to determine which topic is the relevant topic. Based on disambiguating between the two or more topics, the graphical identifier manager 120 may associate the relevant topic to a graphical identifier and cause the graphical identifier to be presented to the virtual space.

In some examples, the communication platform can manage communication channels. In some examples, the communication platform can be a channel-based messaging platform, that in some examples, can be usable by group(s) of users. Users of the communication platform can communicate with other users via communication channels. A communication channel, or virtual space, can be a data route used for exchanging data between and among systems and devices associated with the communication platform. In some examples, a channel can be a virtual space where people can post messages, documents, and/or files. In some examples, access to channels can be controlled by permissions. In some examples, channels can be limited to a single organization, shared between different organizations, public, private, or special channels (e.g., hosted channels with guest accounts where guests can make posts but are prevented from performing certain actions, such as inviting other users to the channel). In some examples, some users can be invited to channels via email, channel invites, direct messages, text messages, and the like. Examples of channels and associated functionality are discussed throughout this disclosure.

In at least one example, the operating system 122 can manage the processor(s) 108, computer-readable media 110, hardware, software, etc. of the server(s) 102.

In at least one example, the datastore 124 can be configured to store data that is accessible, manageable, and updatable. In some examples, the datastore 124 can be integrated with the server(s) 102, as shown in FIG. 1. In other examples, the datastore 124 can be located remotely from the server(s) 102 and can be accessible to the server(s) 102 and/or user device(s), such as the user device 104. The datastore 124 can comprise multiple databases, which can include user/org data 126 and/or virtual space data 128. Additional or alternative data may be stored in the data store and/or one or more other data stores.

In at least one example, the user/org data 126 can include data associated with users of the communication platform. In at least one example, the user/org data 126 can store data in user profiles (which can also be referred to as "user accounts"), which can store data associated with a user, including, but not limited to, one or more user identifiers associated with multiple, different organizations or entities with which the user is associated, one or more communication channel identifiers associated with communication channels to which the user has been granted access, one or more group identifiers for groups (or, organizations, teams, entities, or the like) with which the user is associated, an indication whether the user is an owner or manager of any communication channels, an indication whether the user has any communication channel restrictions, a plurality of messages, a plurality of emojis, a plurality of conversations, a plurality of conversation topics, an avatar, an email address, a real name (e.g., John Doe), a username (e.g., j doe), a password, a time zone, a status, a token, and the like.

In at least one example, the user/org data 126 can include permission data associated with permissions of individual users of the communication platform. In some examples, permissions can be set automatically or by an administrator of the communication platform, an employer, enterprise, organization, or other entity that utilizes the communication platform, a team leader, a group leader, or other entity that utilizes the communication platform for communicating with team members, group members, or the like, an individual user, or the like. Permissions associated with an individual user can be mapped to, or otherwise associated with, an account or profile within the user/org data 126. In some examples, permissions can indicate which users can communicate directly with other users, which channels a user is permitted to access, restrictions on individual channels, which workspaces the user is permitted to access, restrictions on individual workspaces, and the like. In at least one example, the permissions can support the communication platform by maintaining security for limiting access to a defined group of users. In some examples, such users can be defined by common access credentials, group identifiers, or the like, as described above.

In at least one example, the user/org data 126 can include data associated with one or more organizations of the communication platform. In at least one example, the user/org data 126 can store data in organization profiles, which can store data associated with an organization, including, but not limited to, one or more user identifiers associated with the organization, one or more virtual space identifiers associated with the organization (e.g., workspace identifiers, communication channel identifiers, direct message instance identifiers, collaborative document identifiers, canvas identifiers, audio/video conversation identifiers, etc.), an organization identifier associated with the organization, one or more organization identifiers associated with other organizations that are authorized for communication with the organization, and the like.

In at least one example, the virtual space data 128 can include data associated with one or more virtual spaces associated with the communication platform. The virtual space data 128 can include textual data, audio data, video data, images, files, and/or any other type of data configured to be transmitted in association with a virtual space. Non-limiting examples of virtual spaces include workspaces, communication channels, direct messaging instances, collaborative documents, canvases, and audio and/or video conversations. In at least one example, the virtual space data can store data associated with individual virtual spaces separately, such as based on a discrete identifier associated with each virtual space. In some examples, a first virtual space can be associated with a second virtual space. In such examples, first virtual space data associated with the first virtual space can be stored in association with the second virtual space. For example, data associated with a collaborative document that is generated in association with a communication channel may be stored in association with the communication channel. For another example, data associated with an audio and/or video conversation that is conducted in association with a communication channel can be stored in association with the communication channel.

As discussed above, each virtual space of the communication platform can be assigned a discrete identifier that uniquely identifies the virtual space. In some examples, the virtual space identifier associated with the virtual space can include a physical address in the virtual space data 128 where data related to that virtual space is stored. A virtual space may be "public," which may allow any user within an organization (e.g., associated with an organization identifier) to join and participate in the data sharing through the virtual space, or a virtual space may be "private," which may restrict data communications in the virtual space to certain users or users having appropriate permissions to view. In some examples, a virtual space may be "shared," which may allow users associated with different organizations (e.g., entities associated with different organization identifiers) to join and participate in the data sharing through the virtual space. Shared virtual spaces (e.g., shared channels) may be public such that they are accessible to any user of either organization, or they may be private such that they are restricted to access by certain users (e.g., users with appropriate permissions) of both organizations.

In some examples, the datastore 124 can be partitioned into discrete items of data that may be accessed and managed individually (e.g., data shards). Data shards can simplify many technical tasks, such as data retention, unfurling (e.g., detecting that message contents include a link, crawling the link's metadata, and determining a uniform summary of the metadata), and integration settings. In some examples, data shards can be associated with organizations, groups (e.g., workspaces), communication channels, users, or the like.

In some examples, individual organizations can be associated with a database shard within the datastore 124 that stores data related to a particular organization identification. For example, a database shard may store electronic communication data associated with members of a particular organization, which enables members of that particular organization to communicate and exchange data with other members of the same organization in real time or near-real time. In this example, the organization itself can be the owner of the database shard and has control over where and how the related data is stored. In some examples, a database shard can store data related to two or more organizations (e.g., as in a shared virtual space).

In some examples, individual groups can be associated with a database shard within the datastore 124 that stores data related to a particular group identification (e.g., workspace). For example, a database shard may store electronic communication data associated with members of a particular group, which enables members of that particular group to communicate and exchange data with other members of the same group in real time or near-real time. In this example, the group itself can be the owner of the database shard and has control over where and how the related data is stored.

In some examples, a virtual space can be associated with a database shard within the datastore 124 that stores data related to a particular virtual space identification. For example, a database shard may store electronic communication data associated with the virtual space, which enables members of that particular virtual space to communicate and exchange data with other members of the same virtual space in real time or near-real time. As discussed above, the communications via the virtual space can be synchronous and/or asynchronous. In at least one example, a group or organization can be the owner of the database shard and can control where and how the related data is stored.

In some examples, individual users can be associated with a database shard within the datastore 124 that stores data related to a particular user account. For example, a database shard may store electronic communication data associated with an individual user, which enables the user to communicate and exchange data with other users of the communication platform in real time or near-real time. In some examples, the user itself can be the owner of the database shard and has control over where and how the related data is stored.

In some examples, such as when a channel is shared between two organizations, each organization can be associated with its own encryption key. When a user associated with one organization posts a message or file to the shared channel it can be encrypted in the datastore 124 with the encryption key specific to the organization and the other organization can decrypt the message or file prior to accessing the message or file. Further, in examples where organizations are in different geographical areas, data associated with a particular organization can be stored in a location corresponding to the organization and temporarily cached at a location closer to a client (e.g., associated with the other organization) when such messages or files are to be accessed. Data can be maintained, stored, and/or deleted in the datastore 124 in accordance with a data governance policy associated with each specific organization.

The communication interface(s) 112 can include one or more interfaces and hardware components for enabling communication with various other devices (e.g., the user computing device 104), such as over the network(s) 106 or directly. In some examples, the communication interface(s) 112 can facilitate communication via WebSockets, Application Programming Interfaces (APIs) (e.g., using API calls), Hypertext Transfer Protocols (HTTPs), etc.

The server(s) 102 can further be equipped with various input/output devices 114 (e.g., I/O devices). Such devices 114 can include a display, various user interface controls (e.g., buttons, joystick, keyboard, mouse, touch screen, etc.), audio speakers, connection ports and so forth.

In at least one example, the user computing device 104 can include one or more processors 130, computer-readable media 132, one or more communication interfaces 134, and input/output devices 136.

In at least one example, each processor of the processor(s) 130 can be a single processing unit or multiple processing units, and can include single or multiple computing units or multiple processing cores. The processor(s) 130 can comprise any of the types of processors described above with reference to the processor(s) 108 and may be the same as or different than the processor(s) 108.

The computer-readable media 132 can comprise any of the types of computer-readable media 132 described above with reference to the computer-readable media 110 and may be the same as or different than the computer-readable media 110. Functional components stored in the computer-readable media can optionally include at least one application 138 and an operating system 140.

In at least one example, the application 138 can be a mobile application, a web application, or a desktop application, which can be provided by the communication platform or which can be an otherwise dedicated application. In some examples, individual user computing devices associated with the environment 100 can have an instance or versioned instance of the application 138, which can be downloaded from an application store, accessible via the Internet, or otherwise executable by the processor(s) 130 to perform operations as described herein. That is, the application 138 can be an access point, enabling the user computing device 104 to interact with the server(s) 102 to access and/or use communication services available via the communication platform. In at least one example, the application 138 can facilitate the exchange of data between and among various other user computing devices, for example via the server(s) 102. In at least one example, the application 138 can present user interfaces, as described herein. In at least one example, a user can interact with the user interfaces via touch input, keyboard input, mouse input, spoken input, or any other type of input.

A non-limiting example of a user interface 142 is shown in FIG. 1. As illustrated in FIG. 1, the user interface 142 can present data associated with one or more virtual spaces, which may include one or more workspaces. That is, in some examples, the user interface 142 can integrate data from multiple workspaces into a single user interface so that the user (e.g., of the user computing device 104) can access and/or interact with data associated with the multiple workspaces that he or she is associated with and/or otherwise communicate with other users associated with the multiple workspaces. In some examples, the user interface 142 can include a first region 144, or pane, that includes indicator(s) (e.g., user interface element(s) or object(s)) associated with workspace(s) with which the user (e.g., account of the user) is associated. In some examples, the user interface 142 can include a second region 146, or pane, that includes indicator(s) (e.g., user interface element(s), affordance(s), object(s), etc.) representing data associated with the workspace(s) with which the user (e.g., account of the user) is associated. In at least one example, the second region 146 can represent a sidebar of the user interface 142.

In at least one example, the user interface 142 can include a third region 148, or pane, that can be associated with a data feed (or, "feed") indicating messages posted to and/or actions taken with respect to one or more communication channels and/or other virtual spaces for facilitating communications (e.g., a virtual space associated with direct message communication(s), a virtual space associated with event(s) and/or action(s), etc.) as described herein. In at least one example, data associated with the third region 148 can be associated with the same or different workspaces. That is, in some examples, the third region 148 can present data associated with the same or different workspaces via an integrated feed. In some examples, the data can be organized and/or is sortable by workspace, time (e.g., when associated data is posted or an associated operation is otherwise performed), type of action, communication channel, user, or the like. In some examples, such data can be associated with an indication of which user (e.g., member of the communication channel) posted the message and/or performed an action. In examples where the third region 148 presents data associated with multiple workspaces, at least some data can be associated with an indication of which workspace the data is associated with. In some examples, the third region 148 may be resized or popped out as a standalone window.

In at least one example, the operating system 140 can manage the processor(s) 130, computer-readable media 132, hardware, software, etc. of the server(s) 102.

The communication interface(s) 134 can include one or more interfaces and hardware components for enabling communication with various other devices (e.g., the user computing device 104), such as over the network(s) 106 or directly. In some examples, the communication interface(s) 134 can facilitate communication via WebSockets, APIs (e.g., using API calls), HTTPs, etc.

The user computing device 104 can further be equipped with various input/output devices 136 (e.g., I/O devices). Such 110 devices 136 can include a display, various user interface controls (e.g., buttons, joystick, keyboard, mouse, touch screen, etc.), audio speakers, connection ports and so forth.

While techniques described herein are described as being performed by the messaging component 116, the audio/video component 118, the graphical identifier manager 120, and the application 138, techniques described herein can be performed by any other component, or combination of components, which can be associated with the server(s) 102, the user computing device 104, or a combination thereof.

User Interface for a Group-Based Communication System

Figure 2A:
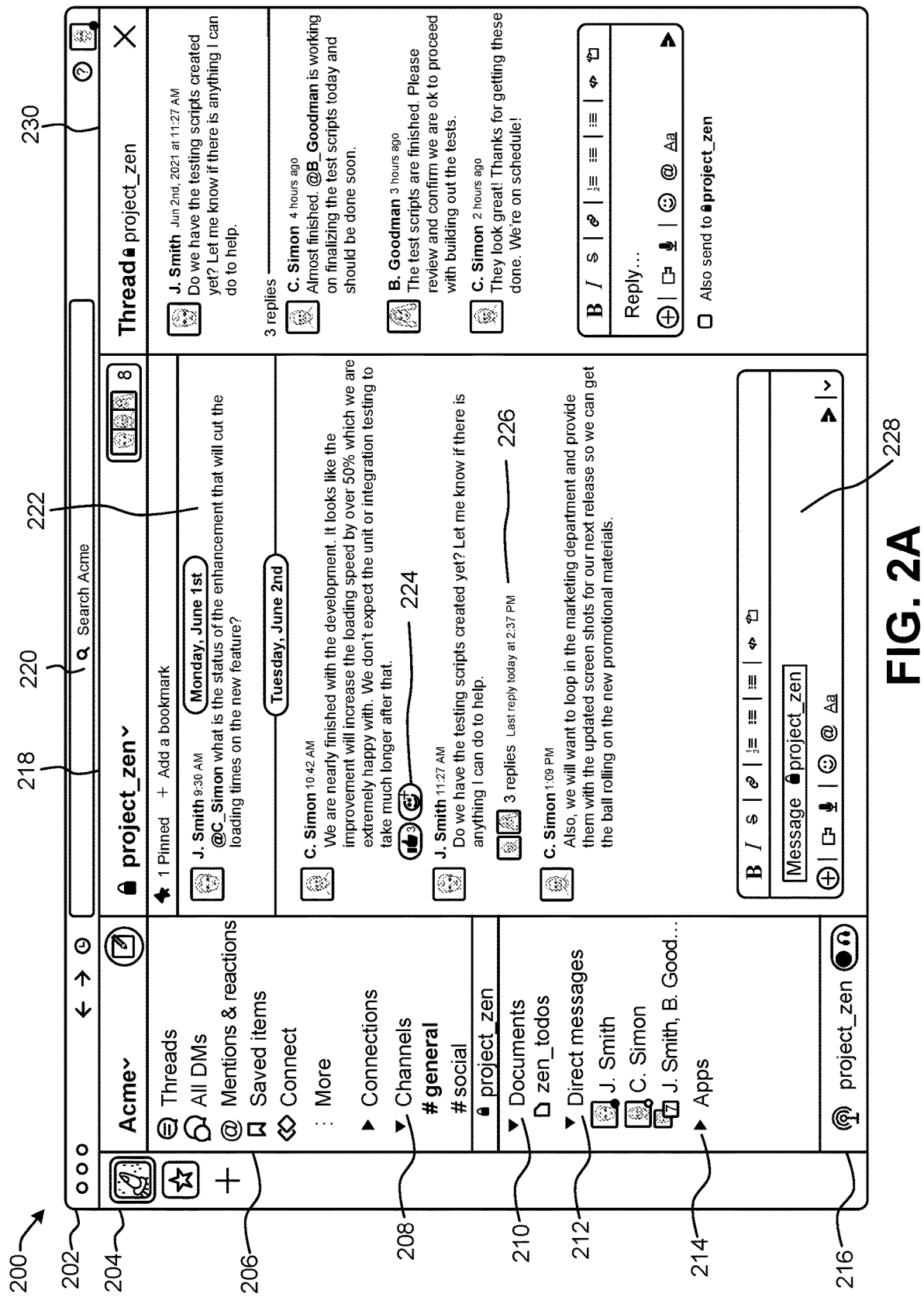
FIG. 2A illustrates a user interface for a group-based communication system for certain examples.

FIG. 2A illustrates a user interface 200 of a group-based communication system, which will be useful in illustrating the operation of various examples discussed herein. The group-based communication system may include communication data such as messages, queries, files, mentions, users or user profiles, interactions, tickets, channels, applications integrated into one or more channels, conversations, workspaces, or other data generated by or shared between users of the group-based communication system. In some instances, the communication data may comprise data associated with a user, such as a user identifier, channels to which the user has been granted access, groups with which the user is associated, permissions, and other user-specific information.

The user interface 200 comprises a plurality of objects such as panes, text entry fields, buttons, messages, or other user interface components that are viewable by a user of the group-based communication system. As depicted, the user interface 200 comprises a title bar 202, a workspace pane 204, a navigation pane 206, channels 208, documents 210 (e.g., collaborative documents), direct messages 212, applications 214, a synchronous multimedia collaboration session pane 216, and channel pane 218.

By way of example and without limitation, when a user opens the user interface 200 they can select a workspace via the workspace pane 204. A particular workspace may be associated with data specific to the workspace and accessible via permissions associated with the workspace. Different sections of the navigation pane 206 can present different data and/or options to a user. Different graphical indicators may be associated with virtual spaces (e.g., channels) to summarize an attribute of the channel (e.g., whether the channel is public, private, shared between organizations, locked, etc.). When a user selects a channel, a channel pane 218 may be presented. In some examples, the channel pane 218 can include a header, pinned items (e.g., documents or other virtual spaces), an "about" document providing an overview of the channel, and the like. In some cases, members of a channel can search within the channel, access content associated with the channel, add other members, post content, and the like. In some examples, depending on the permissions associated with a channel, users who are not members of the channel may have limited ability to interact with (or even view or otherwise access) a channel. As users navigate within a channel they can view messages 222 and may react to messages (e.g., a reaction 224), reply in a thread, start threads, and the like. Further, a channel pane 218 can include a compose pane 228 to compose message(s) and/or other data to associate with a channel. In some examples, the user interface 200 can include a threads pane 230 that provides additional levels of detail of the messages 222. In some examples, different panes can be resized, panes can be popped out to independent windows, and/or independent windows can be merged to multiple panes of the user interface 200. In some examples, users may communicate with other users via a collaboration pane 216, which may provide synchronous or asynchronous voice and/or video capabilities for communication. Of course, these are illustrative examples and additional examples of the aforementioned features are provided throughout this disclosure.

In some examples, title bar 202 comprises search bar 220. The search bar 220 may allow users to search for content located in the current workspace of the group-based communication system, such as files, messages, channels, members, commands, functions, and the like. Users may refine their searches by attributes such as content type, content author, and by users associated with the content. Users may optionally search within specific workspaces, channels, direct message conversations, or documents. In some examples, the title bar 202 comprises navigation commands allowing a user to move backwards and forwards between different panes, as well as to view a history of accessed content. In some examples, the title bar 202 may comprise additional resources such as links to help documents and user configuration settings.

In some examples, the group-based communication system can comprise a plurality of distinct workspaces, where each workspace is associated with different groups of users and channels. Each workspace can be associated with a group identifier and one or more user identifiers can be mapped to, or otherwise associated with, the group identifier. Users corresponding to such user identifiers may be referred to as members of the group. In some examples, the user interface 200 comprises the workspace pane 204 for navigating between, adding, or deleting various workspaces in the group-based communication system. For example, a user may be a part of a workspace for Acme, where the user is an employee of or otherwise affiliated with Acme. The user may also be a member of a local volunteer organization that also uses the group-based communication system to collaborate. To navigate between the two groups, the user may use the workspace pane 204 to change from the Acme workspace to the volunteer organization workspace. A workspace may comprise one or more channels that are unique to that workspace and/or one or more channels that are shared between one or more workspaces. For example, the Acme company may have a workspace for Acme projects, such as Project Zen, a workspace for social discussions, and an additional workspace for general company matters. In some examples, an organization, such as a particular company, may have a plurality of workspaces, and the user may be associated with one or more workspaces belonging to the organization. In yet other examples, a particular workspace can be associated with one or more organizations or other entities associated with the group-based communication system.

In some examples, the navigation pane 206 permits users to navigate between virtual spaces such as pages, channels 208, collaborative documents 210 (such as those discussed at FIG. 2D), applications 214, and direct messages 212 within the group-based communication system. For example, the navigation pane 206 can include indicators representing virtual spaces that can aggregate data associated with a plurality of virtual spaces of which the user is a member. In at least one example, each virtual space can be associated with an indicator in the navigation pane 206. In some examples, an indicator can be associated with an actuation mechanism (e.g., an affordance, also referred to as a graphical element) such that when actuated, can cause the user interface 200 to present data associated with the corresponding virtual space. In at least one example, a virtual space can be associated with all unread data associated with each of the workspaces with which the user is associated. That is, in some examples, if the user requests to access the virtual space associated with "unreads," all data that has not been read (e.g., viewed) by the user can be presented, for example in a feed. In such examples, different types of events and/or actions, which can be associated with different virtual spaces, can be presented via the same feed. In some examples, such data can be organized and/or is sortable by associated virtual space (e.g., virtual space via which the communication was transmitted), time, type of action, user, and/or the like. In some examples, such data can be associated with an indication of which user (e.g., member of the associated virtual space) posted the message and/or performed an action.

In some examples, a virtual space can be associated with the same type of event and/or action. For example, "threads" can be associated with messages, files, etc. posted in threads to messages posted in a virtual space and "mentions and reactions" can be associated with messages or threads where the user has been mentioned (e.g., via a tag) or another user has reacted (e.g., via an emoji, reaction, or the like) to a message or thread posted by the user. That is, in some examples, the same types of events and/or actions, which can be associated with different virtual spaces, can be presented via the same feed. As with the "unreads" virtual space, data associated with such virtual spaces can be organized and/or is sortable by virtual space, time, type of action, user, and/or the like.

In some examples, a virtual space can be associated with facilitating communications between a user and other users of the communication platform. For example, "connect" can be associated with enabling the user to generate invitations to communicate with one or more other users. In at least one example, responsive to receiving an indication of selection of the "connect" indicator, the communication platform can cause a connections interface to be presented.

In some examples, a virtual space can be associated with one or more boards or collaborative documents with which the user is associated. In at least one example, a document can include a collaborative document configured to be accessed and/or edited by two or more users with appropriate permissions (e.g., viewing permissions, editing permissions, etc.). In at least one example, if the user requests to access the virtual space associated with one or more documents with which the user is associated, the one or more documents can be presented via the user interface 200. In at least one example, the documents, as described herein, can be associated with an individual (e.g., private document for a user), a group of users (e.g., collaborative document), and/or one or more communication channels (e.g., members of the communication channel rendered access permissions to the document), such as to enable users of the communication platform to create, interact with, and/or view data associated with such documents. In some examples, the collaborative document can be a virtual space, a board, a canvas, a page, or the like for collaborative communication and/or data organization within the communication platform. In at least one example, the collaborative document can support editable text and/or objects that can be ordered, added, deleted, modified, and/or the like. In some examples, the collaborative document can be associated with permissions defining which users of a communication platform can view and/or edit the document. In some examples, a collaborative document can be associated with a communication channel, and members of the communication channel can view and/or edit the document. In some examples, a collaborative document can be sharable such that data associated with the document is accessible to and/or interactable for members of the multiple communication channels, workspaces, organizations, and/or the like.

In some examples, a virtual space can be associated with a group (e.g., organization, team, etc.) headquarters (e.g., administrative or command center). In at least one example, the group headquarters can include a virtual or digital headquarters for administrative or command functions associated with a group of users. For example, "HQ" can be associated with an interface including a list of indicators associated with virtual spaces configured to enable associated members to communicate. In at least one example, the user can associate one or more virtual spaces with the "HQ" virtual space, such as via a drag and drop operation. That is, the user can determine relevant virtual space(s) to associate with the virtual or digital headquarters, such as to associate virtual space(s) that are important to the user therewith.

In some examples, a virtual space can be associated with one or more boards or collaborative documents with which the user is associated. In at least one example, a document can include a collaborative document configured to be accessed and/or edited by two or more users with appropriate permissions (e.g., viewing permissions, editing permissions, etc.). In at least one example, if the user requests to access the virtual space associated with one or more documents with which the user is associated, the one or more documents can be presented via the user interface 200. In at least one example, the documents, as described herein, can be associated with an individual (e.g., private document for a user), a group of users (e.g., collaborative document), and/or one or more communication channels (e.g., members of the communication channel rendered access permissions to the document), such as to enable users of the communication platform to create, interact with, and/or view data associated with such documents. In some examples, the collaborative document can be a virtual space, a board, a canvas, a page, or the like for collaborative communication and/or data organization within the communication platform. In at least one example, the collaborative document can support editable text and/or objects that can be ordered, added, deleted, modified, and/or the like. In some examples, the collaborative document can be associated with permissions defining which users of a communication platform can view and/or edit the document. In some examples, a collaborative document can be associated with a communication channel, and members of the communication channel can view and/or edit the document. In some examples, a collaborative document can be sharable such that data associated with the document is accessible to and/or interactable for members of the multiple communication channels, workspaces, organizations, and/or the like.

Additionally or in the alternative, in some examples, a virtual space can be associated with one or more canvases with which the user is associated. In at least one example, the canvas can include a flexible canvas for curating, organizing, and sharing collections of information between users. That is, the canvas can be configured to be accessed and/or modified by two or more users with appropriate permissions. In at least one example, the canvas can be configured to enable sharing of text, images, videos, GIFs, drawings (e.g., user-generated drawing via a canvas interface), gaming content (e.g., users manipulating gaming controls synchronously or asynchronously), and/or the like. In at least one example, modifications to a canvas can include adding, deleting, and/or modifying previously shared (e.g., transmitted, presented) data. In some examples, content associated with a canvas can be shareable via another virtual space, such that data associated with the canvas is accessible to and/or rendered interactable for members of the virtual space.

The navigation pane 206 may further comprise indicators representing communication channels (e.g., the channels 208). In some examples, the communication channels can include public channels, private channels, shared channels (e.g., between groups or organizations), single workspace channels, cross-workspace channels, combinations of the foregoing, or the like. In some examples, the communication channels represented can be associated with a single workspace. In some examples, the communication channels represented can be associated with different workspaces (e.g., cross-workspace). In at least one example, if a communication channel is cross-workspace (e.g., associated with different workspaces), the user may be associated with both workspaces, or may only be associated with one of the workspaces. In some examples, the communication channels represented can be associated with combinations of communication channels associated with a single workspace and communication channels associated with different workspaces.

In some examples, the navigation pane 206 may depict some or all of the communication channels that the user has permission to access (e.g., as determined by the permission data). In such examples, the communication channels can be arranged alphabetically, based on most recent interaction, based on frequency of interactions, based on communication channel type (e.g., public, private, shared, cross-workspace, etc.), based on workspace, in user-designated sections, or the like. In some examples, the navigation pane 206 can depict some or all of the communication channels that the user is a member of, and the user can interact with the user interface 200 to browse or view other communication channels that the user is not a member of but are not currently displayed in the navigation pane 206. In some examples, different types of communication channels (e.g., public, private, shared, cross-workspace, etc.) can be in different sections of the navigation pane 206, or can have their own sub-regions or sub-panes in the user interface 200. In some examples, communication channels associated with different workspaces can be in different sections of the navigation pane 206, or can have their own regions or panes in the user interface 200.

In some examples, the indicators can be associated with graphical elements that visually differentiate types of communication channels. For example, project_zen is associated with a lock graphical element. As a non-limiting example, and for the purpose of this discussion, the lock graphical element can indicate that the associated communication channel, project_zen, is private and access thereto is limited, whereas another communication channel, general, is public and access thereto is available to any member of an organization with which the user is associated. In some examples, additional or alternative graphical elements can be used to differentiate between shared communication channels, communication channels associated with different workspaces, communication channels with which the user is or is not a current member, and/or the like.

In at least one example, the navigation pane 206 can include indicators representative of communications with individual users or multiple specified users (e.g., instead of all, or a subset of, members of an organization). Such communications can be referred to as "direct messages." The navigation pane 206 can include indicators representative of virtual spaces that are associated with private messages between one or more users.

The direct messages 212 may be communications between a first user and a second user, or they may be multi-person direct messages between a first user and two or more second users. The navigation pane 206 may be sorted and organized into hierarchies or sections depending on the user's preferences. In some examples, all of the channels to which a user has been granted access may appear in the navigation pane 206. In other examples, the user may choose to hide certain channels or collapse sections containing certain channels. Items in the navigation pane 206 may indicate when a new message or update has been received or is currently unread, such as by bolding the text associated with a channel in which an unread message is located or adding an icon or badge (for example, with a count of unread messages) to the channel name. In some examples, the group-based communication system may additionally or alternatively store permissions data associated with permissions of individual users of the group-based communication system, indicating which channels a user may view or join. Permissions can indicate, for example, which users can communicate directly with other users, which channels a user is permitted to access, restrictions on individual channels, which workspaces the user is permitted to access, and restrictions on individual workspaces.

Additionally or in the alternative, the navigation pane 206 can include a sub-section that is a personalized sub-section associated with a team of which the user is a member. That is, the "team" sub-section can include affordance(s) of one or more virtual spaces that are associated with the team, such as communication channels, collaborative documents, direct messaging instances, audio or video synchronous or asynchronous meetings, and/or the like. In at least one example, the user can associate selected virtual spaces with the team sub-section, such as by dragging and dropping, pinning, or otherwise associating selected virtual spaces with the team sub-section.

Channels within the Group-Based Communication System

In some examples, the group-based communication system is a channel-based messaging platform, as shown in FIG. 2A. Within the group-based communication system, communication may be organized into channels, each dedicated to a particular topic and a set of users. Channels are generally a virtual space relating to a particular topic comprising messages and files posted by members of the channel.

For purposes of this discussion, a "message" can refer to any electronically generated digital object provided by a user using the user computing device 104 and that is configured for display within a communication channel and/or other virtual space for facilitating communications (e.g., a virtual space associated with direct message communication(s), etc.) as described herein. A message may include any text, image, video, audio, or combination thereof provided by a user (using a user computing device). For instance, the user may provide a message that includes text, as well as an image and a video, within the message as message contents. In such an example, the text, image, and video would comprise the message. Each message sent or posted to a communication channel of the communication platform can include metadata comprising a sending user identifier, a message identifier, message contents, a group identifier, a communication channel identifier, or the like. In at least one example, each of the foregoing identifiers may comprise American Standard Code for Information Interchange (ASCII) text, a pointer, a memory address, or the like.

The channel discussion may persist for days, months, or years and provide a historical log of user activity. Members of a particular channel can post messages within that channel that are visible to other members of that channel together with other messages in that channel. Users may select a channel for viewing to see only those messages relevant to the topic of that channel without seeing messages posted in other channels on different topics. For example, a software development company may have different channels for each software product being developed, where developers working on each particular project can converse on a generally singular topic (e.g., project) without noise from unrelated topics. Because the channels are generally persistent and directed to a particular topic or group, users can quickly and easily refer to previous communications for reference. In some examples, the channel pane 218 may display information related to a channel that a user has selected in the navigation pane 206. For example, a user may select the project_zen channel to discuss the ongoing software development efforts for Project Zen. In some examples, the channel pane 218 may include a header comprising information about the channel, such as the channel name, the list of users in the channel, and other channel controls. Users may be able to pin items to the header for later access and add bookmarks to the header. In some examples, links to collaborative documents may be included in the header. In further examples, each channel may have a corresponding virtual space which includes channel-related information such as a channel summary, tasks, bookmarks, pinned documents, and other channel-related links which may be editable by members of the channel.

A communication channel or other virtual space can be associated with data and/or content other than messages, or data and/or content that is associated with messages. For example, non-limiting examples of additional data that can be presented via the channel pane 218 of the user interface 200 include collaborative documents (e.g., documents that can be edited collaboratively, in real-time or near real-time, etc.), audio and/or video data associated with a conversation, members added to and/or removed from the communication channel, file(s) (e.g., file attachment(s)) uploaded and/or removed from the communication channel), application(s) added to and/or removed from the communication channel, post(s) (data that can be edited collaboratively, in near real-time by one or members of a communication channel) added to and/or removed from the communication channel, description added to, modified, and/or removed from the communication channel, modifications of properties of the communication channel, etc.

The channel pane 218 may include messages such as message 222, which is content posted by a user into the channel. Users may post text, images, videos, audio, or any other file as the message 222. In some examples, particular identifiers (in messages or otherwise) may be denoted by prefixing them with predetermined characters. For example, channels may be prefixed by the "#" character (as in #project_zen) and username may be prefixed by the "@" character (as in @J_Smith or @User_A). Messages such as the message 222 may include an indication of which user posted the message and the time at which the message was posted. In some examples, users may react to messages by selecting a reaction button 224. The reaction button 224 allows users to select an icon (sometimes called a reacji in this context), such as a thumbs up, to be associated with the message. Users may respond to messages, such as the message 222, of another user with a new message. In some examples, such conversations in channels may further be broken out into threads. Threads may be used to aggregate messages related to a particular conversation together to make the conversation easier to follow and reply to, without cluttering the main channel with the discussion. Under the message beginning the thread appears a thread reply preview 226. The thread reply preview 226 may show information related to the thread, such as, for example, the number of replies and the members who have replied. Thread replies may appear in a thread pane 230 that may be separate from the channel pane 218 and may be viewed by other members of the channel by selecting the thread reply preview 226 in the channel pane 218.

In some examples, one or both of the channel pane 218 and the thread pane 230 may include a compose pane 228. In some examples, the compose pane 228 allows users to compose and transmit messages 222 to the members of the channel or to those members of the channel who are following the thread (when the message is sent in a thread). The compose pane 228 may have text editing functions such as bold, strikethrough, and italicize, and/or may allow users to format their messages or attach files such as collaborative documents, images, videos, or any other files to share with other members of the channel. In some examples, the compose pane 228 may enable additional formatting options such as numbered or bulleted lists via either the user interface or an API. The compose pane 228 may also function as a workflow trigger to initiate workflows related to a channel or message. In further examples, links or documents sent via the compose pane 228 may include unfurl instructions related to how the content should be displayed.

Synchronous Multimedia Collaboration Sessions

Figure 2B:
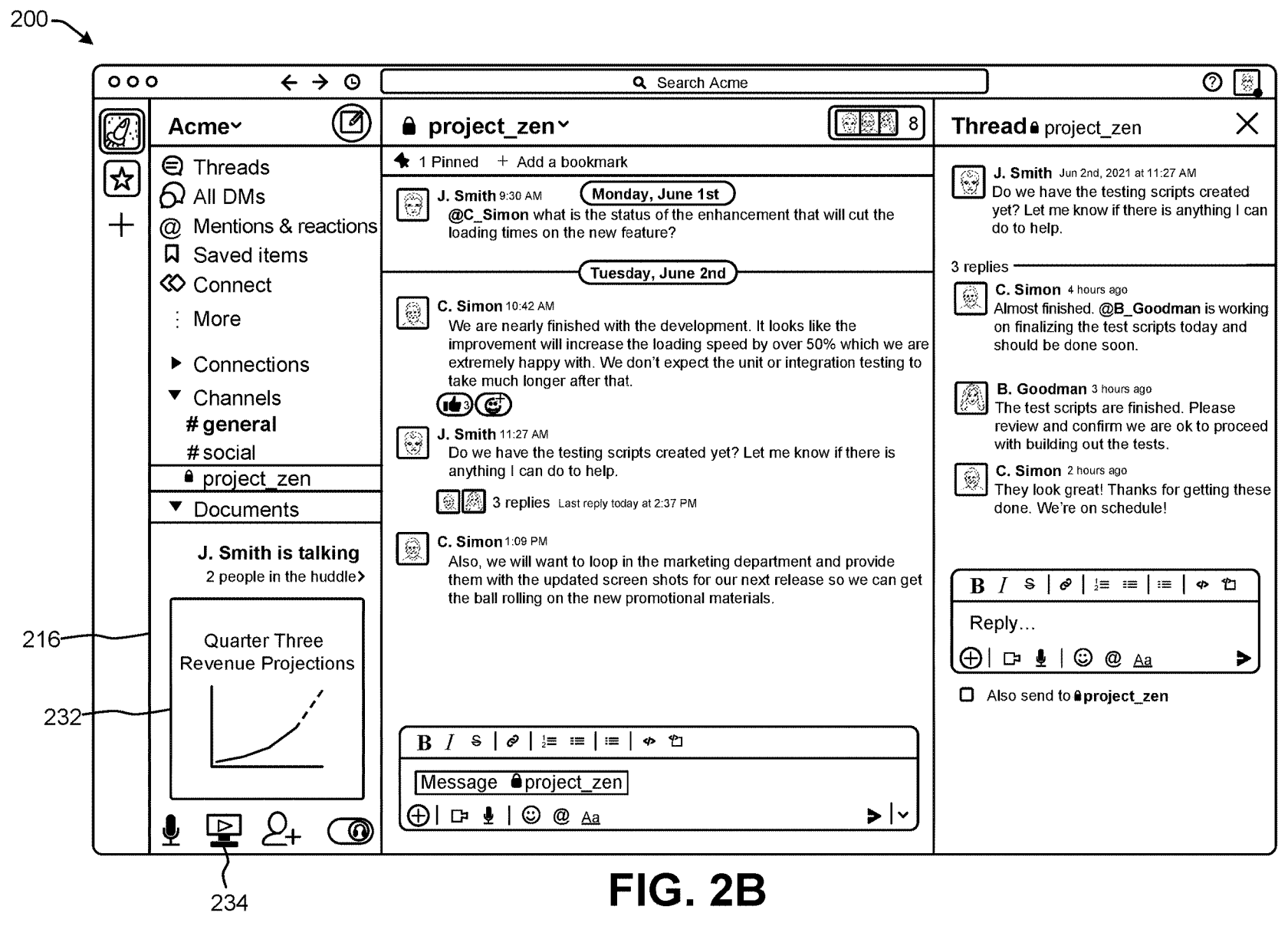

FIG. 2B illustrates a multimedia collaboration session (e.g., a synchronous multimedia collaboration session) that has been triggered from a channel, as shown in pane 216. Synchronous multimedia collaboration sessions may provide ambient, ad hoc multimedia collaboration in the group-based communication system. Users of the group-based communication system can quickly and easily join and leave these synchronous multimedia collaboration sessions at any time, without disrupting the synchronous multimedia collaboration session for other users. In some examples, synchronous multimedia collaboration sessions may be based around a particular topic, a particular channel, a particular direct message or multi-person direct message, or a set of users, while in other examples, synchronous multimedia collaboration sessions may exist without being tied to any channel, topic, or set of users.

Synchronous multimedia collaboration session pane 216 may be associated with a session conducted for a plurality of users in a channel, users in a multi-person direct message conversation, or users in a direct message conversation. Thus, a synchronous multimedia collaboration session may be started for a particular channel, multi-person direct message conversation, or direct message conversation by one or more members of that channel or conversation. Users may start a synchronous multimedia collaboration session in a channel as a means of communicating with other members of that channel who are presently online. For example, a user may have an urgent decision and want immediate verbal feedback from other members of the channel. As another example, a synchronous multimedia collaboration session may be initiated with one or more other users of the group-based communication system through direct messaging. In some examples, the audience of a synchronous multimedia collaboration session may be determined based on the context in which the synchronous multimedia collaboration session was initiated. For example, starting a synchronous multimedia collaboration session in a channel may automatically invite the entire channel to attend. As another example. Starting a synchronous multimedia collaboration session allows the user to start an immediate audio and/or video conversation with other members of the channel without requiring scheduling or initiating a communication session through a third-party interface. In some examples, users may be directly invited to attend a synchronous multimedia collaboration session via a message or notification.

Synchronous multimedia collaboration sessions may be short, ephemeral sessions from which no data is persisted. Alternatively, in some examples, synchronous multimedia collaboration sessions may be recorded, transcribed, and/or summarized for later review. In other examples, contents of the synchronous multimedia collaboration session may automatically be persisted in a channel associated with the synchronous multimedia collaboration session. Members of a particular synchronous multimedia collaboration session can post messages within a messaging thread associated with that synchronous multimedia collaboration session that are visible to other members of that synchronous multimedia collaboration session together with other messages in that thread.

The multimedia in a synchronous multimedia collaboration session may include collaboration tools such as any or all of audio, video, screen sharing, collaborative document editing, whiteboarding, co-programming, or any other form of media. Synchronous multimedia collaboration sessions may also permit a user to share the user's screen with other members of the synchronous multimedia collaboration session. In some examples, members of the synchronous multimedia collaboration session may mark-up, comment on, draw on, or otherwise annotate a shared screen. In further examples, such annotations may be saved and persisted after the synchronous multimedia collaboration session has ended. A canvas may be created directly from a synchronous multimedia collaboration session to further enhance the collaboration between users.

In some examples, a user may start a synchronous multimedia collaboration session via a toggle in synchronous multimedia collaboration session pane 216 shown in FIG. 2B. Once a synchronous multimedia collaboration session has been started, synchronous multimedia collaboration session pane 216 may be expanded to provide information about the synchronous multimedia collaboration session such as how many members are present, which user is currently talking, which user is sharing the user's screen, and/or screen share preview 232. In some examples, users in the synchronous multimedia collaboration session may be displayed with an icon indicating that they are participating in the synchronous multimedia collaboration session. In further examples, an expanded view of the participants may show which users are active in the synchronous multimedia collaboration session and which are not. Screen share preview 232 may depict the desktop view of a user sharing the user's screen, or a particular application or presentation. Changes to the user's screen, such as the user advancing to the next slide in a presentation, will automatically be depicted in screen share preview 232. In some examples, the screen share preview 232 may be actuated to cause the screen share preview 232 to be enlarged such that it is displayed as its own pane within the group-based communication system. In some examples, the screen share preview 232 can be actuated to cause the screen share preview 232 to pop out into a new window or application separate and distinct from the group-based communication system. In some examples, the synchronous multimedia collaboration session pane 216 may comprise tools for the synchronous multimedia collaboration session allowing a user to mute the user's microphone or invite other users. In some examples, the synchronous multimedia collaboration session pane 216 may comprise a screen share button 234 that may permit a user to share the user's screen with other members of the synchronous multimedia collaboration session pane 216. In some examples, the screen share button 234 may provide a user with additional controls during a screen share. For example, a user sharing the user's screen may be provided with additional screen share controls to specify which screen to share, to annotate the shared screen, or to save the shared screen.

In some cases, the synchronous multimedia collaboration session pane 216 may persist in the navigation pane 206 regardless of the state of the group-based communication system. In some examples, when no synchronous multimedia collaboration session is active and/or depending on which item is selected from the navigation pane 206, the synchronous multimedia collaboration session pane 216 may be hidden or removed from being presented via the user interface 200. In some instances, when the pane 216 is active, the pane 216 can be associated with a currently selected channel, direct message, or multi-person direct message such that a synchronous multimedia collaboration session may be initiated and associated with the currently selected channel, direct message, or multi-person direct message.

A list of synchronous multimedia collaboration sessions may include one or more active synchronous multimedia collaboration sessions selected for recommendation. For example, the synchronous multimedia collaboration sessions may be selected from a plurality of currently active synchronous multimedia collaboration sessions. Further, the synchronous multimedia collaboration sessions may be selected based in part on user interaction with the sessions or some association of the instant user with the sessions or users involved in the sessions. For example, the recommended synchronous multimedia collaboration sessions may be displayed based in part on the instant user having been invited to a respective synchronous multimedia collaboration session or having previously collaborated with the users in the recommended synchronous multimedia collaboration session. In some examples, the list of synchronous multimedia collaboration sessions further includes additional information for each respective synchronous multimedia collaboration session, such as an indication of the participating users or number of participating users, a topic for the synchronous multimedia collaboration session, and/or an indication of an associated group-based communication channel, multi-person direct message conversation, or direct message conversation.

In some examples, a list of recommended active users may include a plurality of group-based communication system users recommended based on at least one of user activity, user interaction, or other user information. For example, the list of recommended active users may be selected based on an active status of the users within the group-based communication system; historic, recent, or frequent user interaction with the instant user (such as communicating within the group-based communication channel); or similarity between the recommended users and the instant user (such as determining that a recommended user shares common membership in channels with the instant user). In some examples, machine learning techniques such as cluster analysis can be used to determine recommended users. The list of recommended active users may include status user information for each recommended user, such as whether the recommended user is active, in a meeting, idle, in a synchronous multimedia collaboration session, or offline. In some examples, the list of recommended active users further comprises a plurality of actuatable buttons corresponding to some of or all the recommended users (for example, those recommended users with a status indicating availability) that, when selected, may be configured to initiate at least one of a text-based communication session (such as a direct message conversation) or a synchronous multimedia collaboration session.

In some examples, one or more recommended asynchronous multimedia collaboration sessions or meetings can be displayed in an asynchronous meeting section. By contrast with a synchronous multimedia collaboration session (described above), an asynchronous multimedia collaboration session allows each participant to collaborate at a time convenient to them. This collaboration participation is then recorded for later consumption by other participants, who can generate additional multimedia replies. In some examples, the replies are aggregated in a multimedia thread (for example, a video thread) corresponding to the asynchronous multimedia collaboration session. For example, an asynchronous multimedia collaboration session may be used for an asynchronous meeting where a topic is posted in a message at the beginning of a meeting thread and participants of the meeting may reply by posting a message or a video response. The resulting thread then comprises any documents, video, or other files related to the asynchronous meeting. In some examples, a preview of a subset of video replies may be shown in the asynchronous collaboration session or thread. This can allow, for example, a user to jump to a relevant segment of the asynchronous multimedia collaboration session or to pick up where they left off previously.

Connecting within the Group-Based Communication System

Figure 2C:
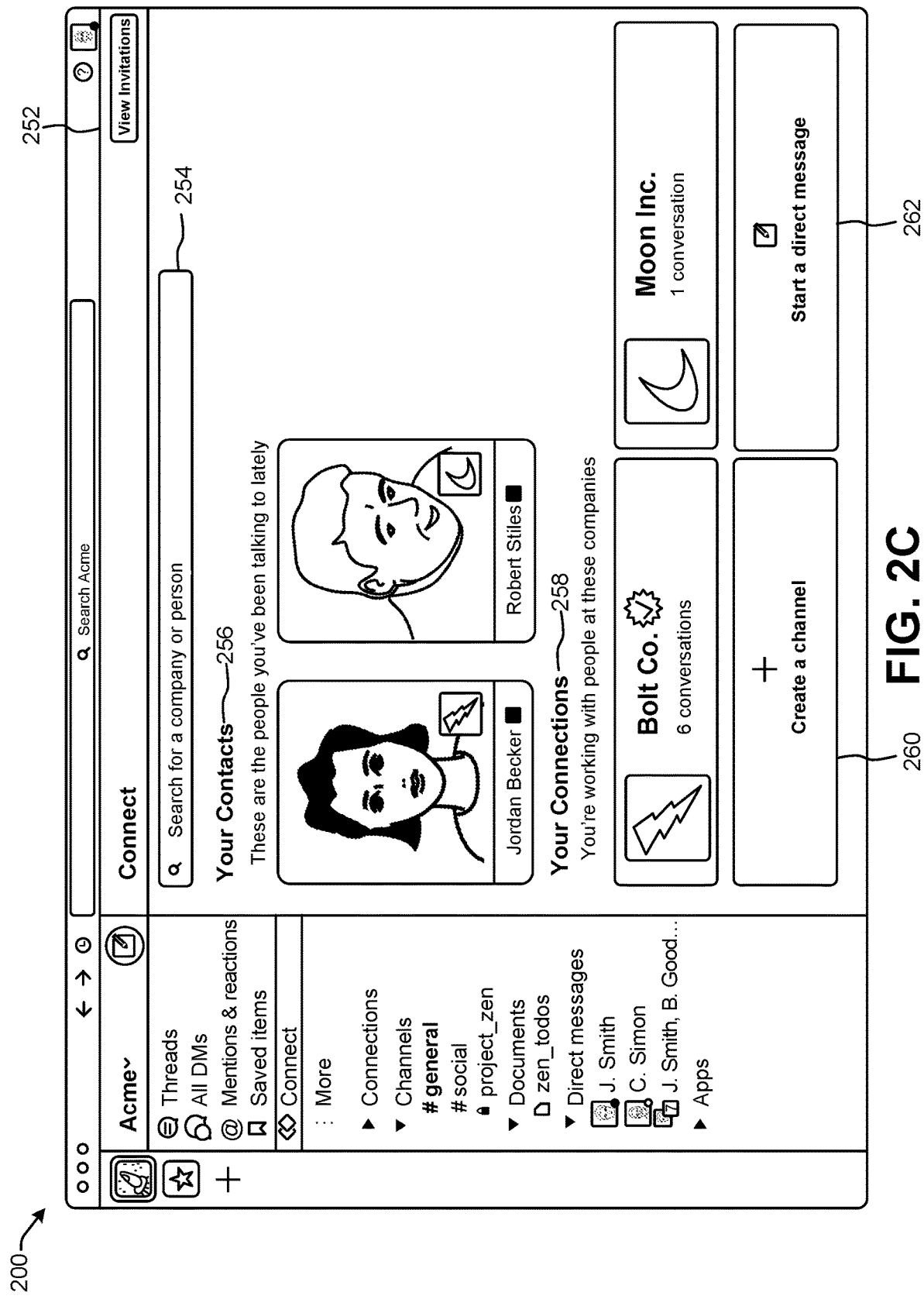
FIG. 2C illustrates a user interface for inter-organization collaboration within the group-based communication system for certain examples.

FIG. 2C illustrates user interface 200 displaying a connect pane 252. The connect pane 252 may provide tools and resources for users to connect across different organizations, where each organization may have their own (normally private) instance of the group-based communication system or may not yet belong to the group-based communication system. For example, a first software company may have a joint venture with a second software company with whom they wish to collaborate on jointly developing a new software application. The connect pane 252 may enable users to determine which other users and organizations are already within the group-based communication system, and to invite those users and organizations currently outside of the group-based communication system to join.

The connect pane 252 may comprise a connect search bar 254, recent contacts 256, connections 258, a create channel button 260, and/or a start direct message button 262. In some examples, the connect search bar 254 may permit a user to search for users within the group-based communication system. In some examples, only users from organizations that have connected with the user's organization will be shown in the search results. In other examples, users from any organization that uses the group-based communication system can be displayed. In still other examples, users from organizations that do not yet use the group-based communication can also be displayed, allowing the searching user to invite them to join the group-based communication system. In some examples, users can be searched for via their group-based communication system username or their email address. In some examples, email addresses may be suggested or autocompleted based on external sources of data such as email directories or the searching user's contact list.

In some examples, external organizations as well as individual users may be shown in response to a user search. External organizations may be matched based on an organization name or internet domain, as search results may include organizations that have not yet joined the group-based communication system (similar to searching and matching for a particular user, discussed above). External organizations may be ranked based in part on how many users from the user's organization have connected with users of the external organization. Responsive to a selection of an external organization in a search result, the searching user may be able to invite the external organization to connect via the group-based communication system.

In some examples, the recent contacts 256 may display users with whom the instant user has recently interacted. The recent contacts 256 may display the user's name, company, and/or a status indication. The recent contacts 256 may be ordered based on which contacts the instant user most frequently interacts with or based on the contacts with whom the instant user most recently interacted. In some examples each recent contact of the recent contacts 256 may be an actuatable control allowing the instant user to quickly start a direct message conversation with the recent contact, invite them to a channel, or take any other appropriate user action for that recent contact.

In some examples, the connections 258 may display a list of companies (e.g., organizations) with which the user has interacted. For each company, the name of the company may be displayed along with the company's logo and an indication of how many interactions the user has had with the company, for example the number of conversations. In some examples, each connection of the connections 258 may be an actuatable control allowing the instant user to quickly invite the external organization to a shared channel, display recent connections with that external organization, or take any other appropriate organization action for that connection.

In some examples, the create channel button 260 allows a user to create a new shared channel between two different organizations. Selecting the create channel button 260 may further allow a user to name the new connect channel and enter a description for the connect channel. In some examples, the user may select one or more external organizations or one or more external users to add to the shared channel. In other examples, the user may add external organizations or external users to the shared channel after the shared channel is created. In some examples, the user may elect whether to make the connect channel private (e.g., accessible only by invitation from a current member of the private channel).

In some examples, the start direct message button 262 allows a user to quickly start a direct message (or multi-person direct message) with external users at an external organization. In some examples, the external user identifier at an external organization may be supplied by the instant user as the external user's group-based communication system username or as the external user's email address. In some examples, an analysis of the email domain of the external user's email address may affect the message between the user and the external user. For example, the external user's identifier may indicate (for example, based on an email address domain) that the user's organization and the external user's organization are already connected. In some such examples, the email address may be converted to a group-based communication system username. Alternatively, the external user's identifier may indicate that the external user's organization belongs to the group-based communication system but is not connected to the instant user's organization. In some such examples, an invitation to connect to the instant user's organization may be generated in response. As another alternative, the external user may not be a member of the group-based communication system, and an invitation to join the group-based communication system as a guest or a member may be generated in response.

Collaborative Documents

Figure 2D:
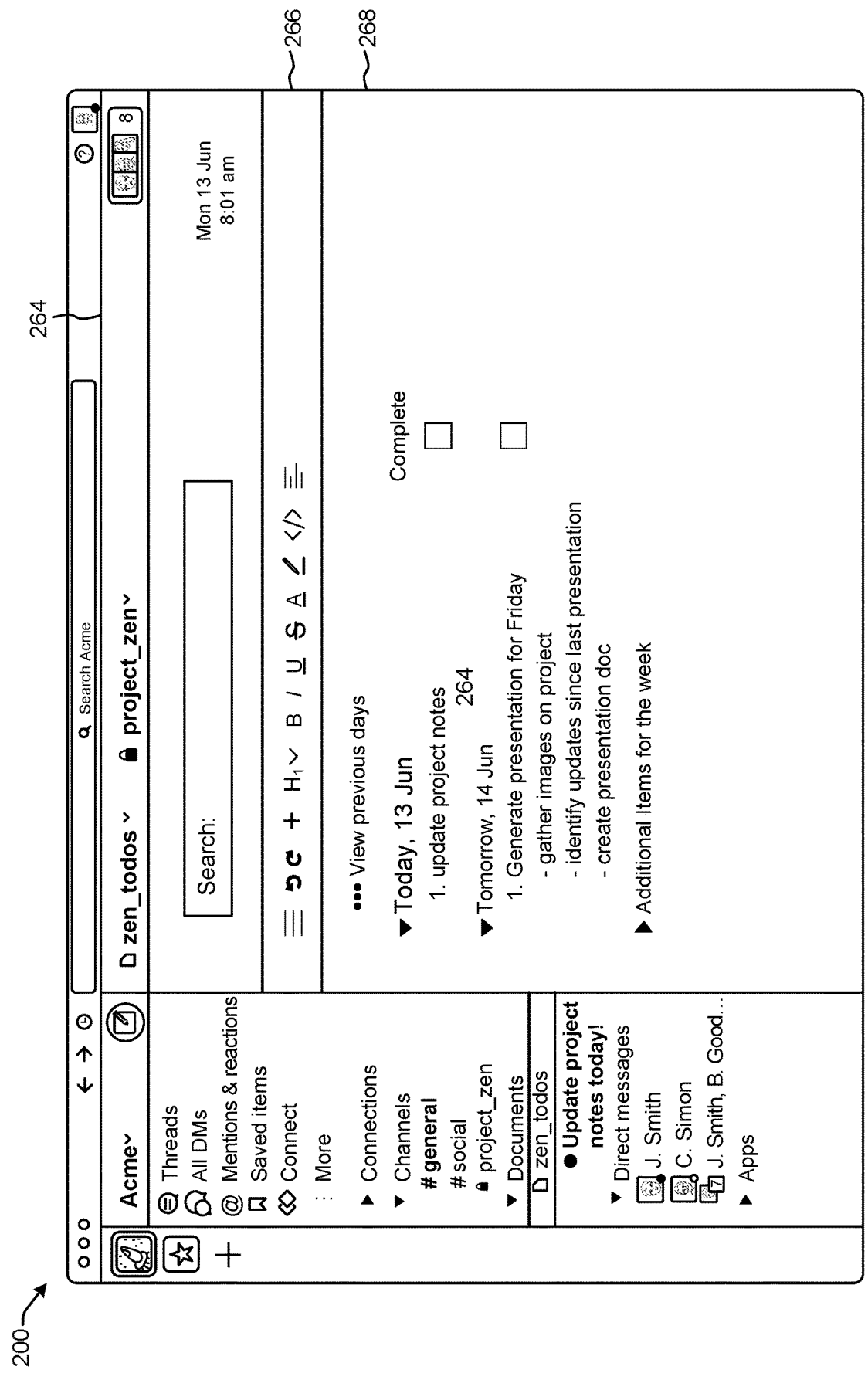
FIG. 2D illustrates a user interface for collaborative documents within the group-based communication system for certain examples.

FIG. 2D illustrates user interface 200 displaying a collaboration document pane 264. A collaborative document may be any file type, such as a PDF, video, audio, word processing document, etc., and is not limited to a word processing document or a spreadsheet. A collaborative document may be modified and edited by two or more users. A collaborative document may also be associated with different user permissions, such that based on a user's permissions for the document (or sections of the document as discussed below), the user may selectively be permitted to view, edit, or comment on the collaborative document (or sections of the collaborative document). As such, users within the set of users having access to the document may have varying permissions for viewing, editing, commenting, or otherwise interfacing with the collaborative document. In some examples, permissions can be determined and/or assigned automatically based on how document(s) are created and/or shared. In some examples, permission can be determined manually. Collaborative documents may allow users to simultaneously or asynchronously create and modify documents. Collaborative documents may integrate with the group-based communication system and can both initiate workflows and be used to store the results of workflows, which are discussed further below with respect to FIGS. 3A and 3B.

In some examples, the user interface 200 can comprise one or more collaborative documents (or one or more links to such collaborative documents). A collaborative document (also referred to as a document or canvas) can include a flexible workspace for curating, organizing, and sharing collections of information between users. Such documents may be associated with a synchronous multimedia collaboration session, an asynchronous multimedia collaboration session, a channel, a multi-person direct message conversation, and/or a direct message conversation. Shared canvases can be configured to be accessed and/or modified by two or more users with appropriate permissions. Alternatively or in addition, a user might have one or more private documents that are not associated with any other users.

Further, such documents can be @mentioned, such that particular documents can be referred to within channels (or other virtual spaces or documents) and/or other users can be @mentioned within such a document. For example, @mentioning a user within a document can provide an indication to that user and/or can provide access to the document to the user. In some examples, tasks can be assigned to a user via an @mention and such task(s) can be populated in the pane or sidebar associated with that user.

In some examples, a channel and a collaborative document 268 can be associated such that when a comment is posted in a channel it can be populated to a document 268, and vice versa.

In some examples, when a first user interacts with a collaborative document, the communication platform can identify a second user account associated with the collaborative document and present an affordance (e.g., a graphical element) in a sidebar (e.g., the navigation pane 206) indicative of the interaction. Further, the second user can select the affordance and/or a notification associated with or representing the interaction to access the collaborative document, to efficiently access the document and view the update thereto.

In some examples, as one or more users interact with a collaborative document, an indication (e.g., an icon or other user interface element) can be presented via user interfaces with the collaborative document to represent such interactions. For examples, if a first instance of the document is presently open on a first user computing device of a first user, and a second instance of the document is presently open on a second user computing device of a second user, one or more presence indicators can be presented on the respective user interfaces to illustrate various interactions with the document and by which user. In some examples, a presence indicator may have attributes (e.g., appearance attributes) that indicate information about a respective user, such as, but not limited to, a permission level (e.g., edit permissions, read-only access, etc.), virtual-space membership (e.g., whether the member belongs to a virtual space associated with the document), and the manner in which the user is interacting with the document (e.g., currently editing, viewing, open but not active, etc.).

In some examples, a preview of a collaborative document can be provided. In some examples, a preview can comprise a summary of the collaborative document and/or a dynamic preview that displays a variety of content (e.g., as changing text, images, etc.) to allow a user to quickly understand the context of a document. In some examples, a preview can be based on user profile data associated with the user viewing the preview (e.g., permissions associated with the user, content viewed, edited, created, etc. by the user), and the like.

In some examples, a collaborative document can be created independent of or in connection with a virtual space and/or a channel. A collaborative document can be posted in a channel and edited or interacted with as discussed herein, with various affordances or notifications indicating presence of users associated with documents and/or various interactions.

In some examples, a machine learning model can be used to determine a summary of contents of a channel and can create a collaborative document comprising the summary for posting in the channel. In some examples, the communication platform may identify the users within the virtual space, actions associated with the users, and other contributions to the conversation to generate the summary document. As such, the communication platform can enable users to create a document (e.g., a collaborative document) for summarizing content and events that transpired within the virtual space.

In some examples, documents can be configured to enable sharing of content including (but not limited to) text, images, videos, GIP s, drawings (e.g., user-generated drawings via a drawing interface), or gaming content. In some examples, users accessing a canvas can add new content or delete (or modify) content previously added. In some examples, appropriate permissions may be required for a user to add content or to delete or modify content added by a different user. Thus, for example, some users may only be able to access some or all of a document in view-only mode, while other users may be able to access some or all of the document in an edit mode allowing those users to add or modify its contents. In some examples, a document can be shared via a message in a channel, multi-person direct message, or direct message, such that data associated with the document is accessible to and/or rendered interactable for members of the channel or recipients of the multi-person direct message or direct message.

In some examples, the collaboration document pane 264 may comprise collaborative document toolbar 266 and collaborative document 268. In some examples, collaborative document toolbar 266 may provide the ability to edit or format posts, as discussed herein.

In some examples, collaborative documents may comprise free-form unstructured sections and workflow-related structured sections. In some examples, unstructured sections may include areas of the document in which a user can freely modify the collaborative document without any constraints. For example, a user may be able to freely type text to explain the purpose of the document. In some examples, a user may add a workflow or a structured workflow section by typing the name of (or otherwise mentioning) the workflow. In further examples, typing the "at" sign (@), a previously selected symbol, or a predetermined special character or symbol may provide the user with a list of workflows the user can select to add to the document. For example, a user may indicate that a marketing team member needs to sign off on a proposal by typing "!Marketing Approval" to initiate a workflow that culminates in a member of the marketing team approving the proposal. Placement of an exclamation point prior to the group name of "Marketing Approval" initiates a request for a specification action, in this case routing the proposal for approval. In some examples, structured sections may include text entry, selection menus, tables, checkboxes, tasks, calendar events, or any other document section. In further examples, structured sections may include text entry spaces that are a part of a workflow. For example, a user may enter text into a text entry space detailing a reason for approval, and then select a submit button that will advance the workflow to the next step of the workflow. In some examples, the user may be able to add, edit, or remove structured sections of the document that make up the workflow components.

In examples, sections of the collaborative document may have individual permissions associated with them. For example, a collaborative document having sections with individual permissions may provide a first user permission to view, edit, or comment on a first section, while a second user does not have permission to view, edit, or comment on the first section. Alternatively, a first user may have permissions to view a first section of the collaborative document, while a second user has permissions to both view and edit the first section of the collaborative document. The permissions associated with a particular section of the document may be assigned by a first user via various methods, including manual selection of the particular section of the document by the first user or another user with permission to assign permissions, typing or selecting an "assignment" indicator, such as the "@" symbol, or selecting the section by a name of the section. In further examples, permissions can be assigned for a plurality of collaborative documents at a single instance via these methods. For example, a plurality of collaborative documents each has a section entitled "Group Information," where the first user with permission to assign permissions desires an entire user group to have access to the information in the "Group Information" section of the plurality of collaborative documents. In examples, the first user can select the plurality of collaborative documents and the "Group Information" section to effectuate permissions to access (or view, edit, etc.) to the entire user group the "Group Information" section of each of the plurality of collaborative documents.

Automation in the Group-Based Communication System

Figure 3A:
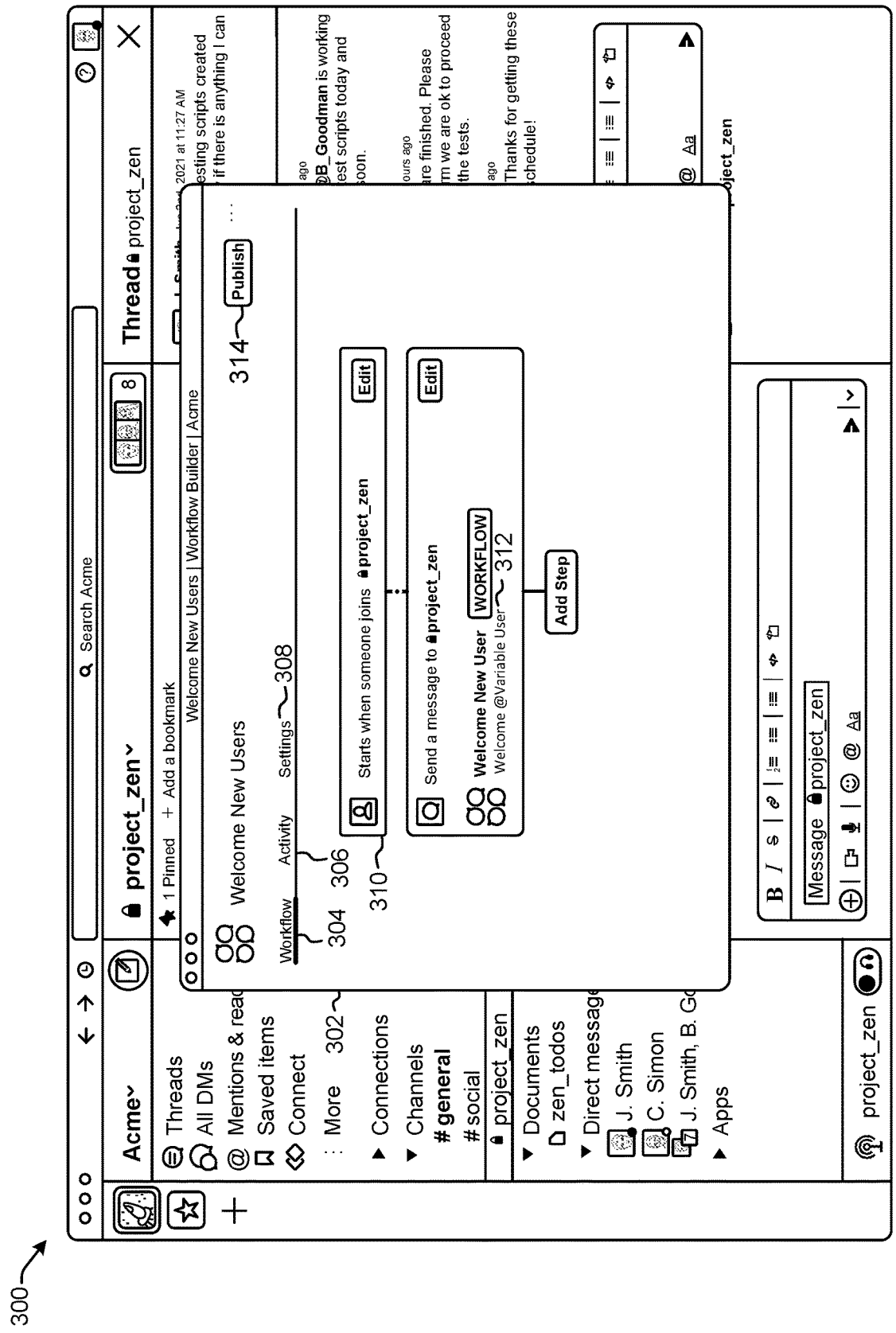
FIG. 3A depicts a user interface for workflows within a group-based communication system.

FIG. 3A illustrates user interface 300 for automation in the group-based communication system. Automation, also referred to as workflows, allow users to automate functionality within the group-based communication system. Workflow builder 302 is depicted which allows a user to create new workflows, modify existing workflows, and review the workflow activity. Workflow builder 302 may comprise a workflow tab 304, an activity tab 306, and/or a settings tab 308. In some examples, workflow builder may include a publish button 314 which permits a user to publish a new or modified workflow.

The workflow tab 304 may be selected to enable a user to create a new workflow or to modify an existing workflow. For example, a user may wish to create a workflow to automatically welcome new users who join a channel. A workflow may comprise workflow steps 310. Workflow steps 310 may comprise at least one trigger which initiates the workflow and at least one function which takes an action once the workflow is triggered. For example, a workflow may be triggered when a user joins a channel and a function of the workflow may be to post within the channel welcoming the new user. In some examples, workflows may be triggered from a user action, such as a user reacting to a message, joining a channel, or collaborating in a collaborative document, from a scheduled date and time, or from a web request from a third-party application or service. In further examples, workflow functionality may include sending messages or forms to users, channels, or any other virtual space, modifying collaborative documents, or interfacing with applications. Workflow functionality may include workflow variables 312. For example, a welcome message may include a user's name via a variable to allow for a customized message. Users may edit existing workflow steps or add new workflow steps depending on the desired workflow functionality. Once a workflow is complete, a user may publish the workflow using publish button 314. A published workflow will wait until it is triggered, at which point the functions will be executed.

Activity tab 306 may display information related to a workflow's activity. In some examples, the activity tab 306 may show how many times a workflow has been executed. In further examples, the activity tab 306 may include information related to each workflow execution including the status, last activity date, time of execution, user who initiated the workflow, and other relevant information. The activity tab 306 may permit a user to sort and filter the workflow activity to find useful information.

A settings tab 308 may permit a user to modify the settings of a workflow. In some examples, a user may change a title or an icon associated with the workflow. Users may also manage the collaborators associated with a workflow. For example, a user may add additional users to a workflow as collaborators such that the additional users can modify the workflow. In some examples, settings tab 308 may also permit a user to delete a workflow.

Figure 3B:
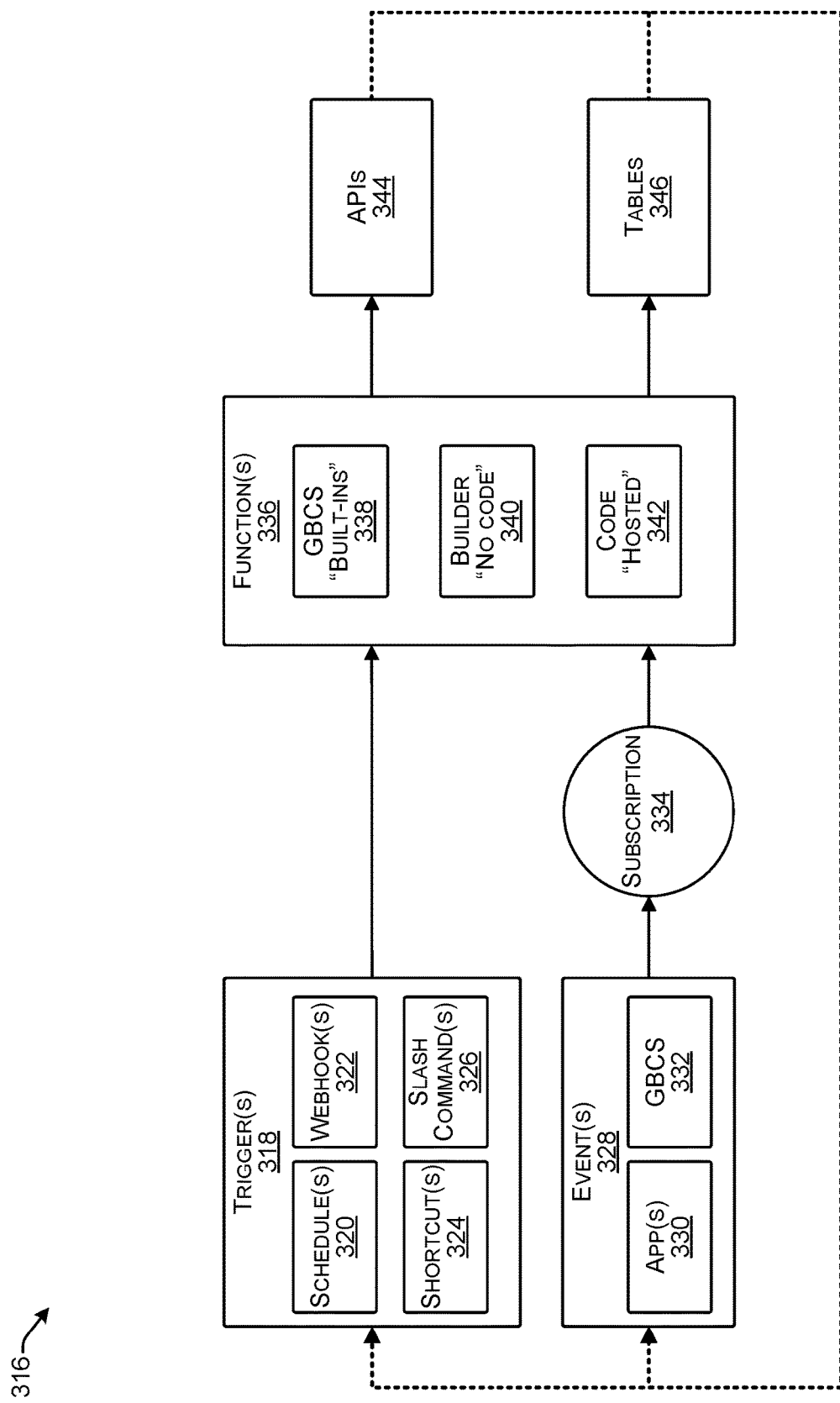
FIG. 3B depicts a block diagram for carrying out certain examples, as discussed herein.

FIG. 3B depicts elements related to workflows in the group-based communication system and is referred to generally by reference numeral 316. In various examples, trigger(s) 318 can be configured to invoke execution of function(s) 336 responsive to user instructions. A trigger initiates function execution and may take the form of one or more schedule(s) 320, webhook(s) 322, shortcut(s) 324, and/or slash command(s) 326. In some examples, the schedule 320 operates like a timer so that a trigger may be scheduled to fire periodically or once at a predetermined point in the future. In some examples, an end user of an event-based application sets an arbitrary schedule for the firing of a trigger, such as once-an-hour or every day at 9:15 AM.

Additionally, triggers 318 may take the form of the webhook 322. The webhook 322 may be a software component that listens at a webhook URL and port. In some examples, a trigger fires when an appropriate HTTP request is received at the webhook URL and port. In some examples, the webhook 322 requires proper authentication such as by way of a bearer token. In other examples, triggering will be dependent on payload content.

Another source of one of the trigger(s) 318 is a shortcut in the shortcut(s) 324. In some examples, the shortcut(s) 324 may be global to a group-based communication system and are not specific to a group-based communication system channel or workspace. Global shortcuts may trigger functions that are able to execute without the context of a particular group-based communication system message or group-based communication channel. By contrast, message- or channel-based shortcuts are specific to a group-based communication system message or channel and operate in the context of the group-based communication system message or group-based communication channel.

A further source of one of triggers 318 may be provided by way of slash commands 326. In some examples, the slash command(s) 326 may serve as entry points for group-based communication system functions, integrations with external services, or group-based communication system message responses. In some examples, the slash commands 326 may be entered by a user of a group-based communication system to trigger execution of application functionality. Slash commands may be followed by slash-command-line parameters that may be passed along to any group-based communication system function that is invoked in connection with the triggering of a group-based communication system function such as one of functions 336.

An additional way in which a function is invoked is when an event (such as one of events 328) matches one or more conditions as predetermined in a subscription (such as subscription 334). Events 328 may be subscribed to by any number of subscriptions 334, and each subscription may specify different conditions and trigger a different function. In some examples, events are implemented as group-based communication system messages that are received in one or more group-based communication system channels. For example, all events may be posted as non-user visible messages in an associated channel, which is monitored by subscriptions 334. App events 330 may be group-based communication system messages with associated metadata that are created by an application in a group-based communication system channel. Events 328 may also be direct messages received by one or more group-based communication system users, which may be an actual user or a technical user, such as a bot. A bot is a technical user of a group-based communication system that is used to automate tasks. A bot may be controlled programmatically to perform various functions. A bot may monitor and help process group-based communication system channel activity as well as post messages in group-based communication system channels and react to members' in-channel activity. Bots may be able to post messages and upload files as well as be invited or removed from both public and private channels in a group-based communication system.

Events 328 may also be any event associated with a group-based communication system. Such group-based communication system events 332 include events relating to the creation, modification, or deletion of a user account in a group-based communication system or events relating to messages in a group-based communication system channel, such as creating a message, editing or deleting a message, or reacting to a message. Events 328 may also relate to creation, modification, or deletion of a group-based communication system channel or the membership of a channel. Events 328 may also relate to user profile modification or group creation, member maintenance, or group deletion.

As described above, subscription 334 indicates one or more conditions that, when matched by events, trigger a function. In some examples, a set of event subscriptions is maintained in connection with a group-based communication system such that when an event occurs, information regarding the event is matched against a set of subscriptions to determine which (if any) of functions 336 should be invoked. In some examples, the events to which a particular application may subscribe are governed by an authorization framework. In some instances, the event types matched against subscriptions are governed by OAuth permission scopes that may be maintained by an administrator of a particular group-based communication system.

In some examples, functions 336 can be triggered by triggers 318 and events 328 to which the function is subscribed. Functions 336 take zero or more inputs, perform processing (potentially including accessing external resources), and return zero or more results. Functions 336 may be implemented in various forms. First, there are group-based communication system built-ins 338, which are associated with the core functionality of a particular group-based communication system. Some examples include creating a group-based communication system user or channel.

Second are no-code builder functions 340 that may be developed by a user of a group-based communication system user in connection with an automation user interface such as workflow builder user interface. Third, there are hosted-code functions 342 that are implemented by way of group-based communication system applications developed as software code in connection with a software development environment.

These various types of functions 336 may in turn integrate with APIs 344. In some examples, APIs 344 are associated with third-party services that functions 336 employ to provide a custom integration between a particular third-party service and a group-based communication system. Examples of third-party service integrations include video conferencing, sales, marketing, customer service, project management, and engineering application integration. In such an example, one of the triggers 318 would be a slash command 326 that is used to trigger a hosted-code function 342, which makes an API call to a third-party video conferencing provider by way of one of the APIs 344. As shown in FIG. 3B, the APIs 344 may themselves also become a source of any number of triggers 318 or events 328. Continuing the above example, successful completion of a video conference would trigger one of the functions 336 that sends a message initiating a further API call to the third-party video conference provider to download and archive a recording of the video conference and store it in a group-based communication system channel.

In addition to integrating with APIs 344, functions 336 may persist and access data in tables 346. In some examples, tables 346 are implemented in connection with a database environment associated with a serverless execution environment in which a particular event-based application is executing. In some instances, tables 346 may be provided in connection with a relational database environment. In other examples, tables 346 are provided in connection with a database mechanism that does not employ relational database techniques. As shown in FIG. 3B, in some examples, reading or writing certain data to one or more of tables 346, or data in table matching predefined conditions, is itself a source of some number of triggers 318 or events 328. For example, if tables 346 are used to maintain ticketing data in an incident-management system, then a count of open tickets exceeding a predetermined threshold may trigger a message being posted in an incident-management channel in the group-based communication system.

Figure 4:
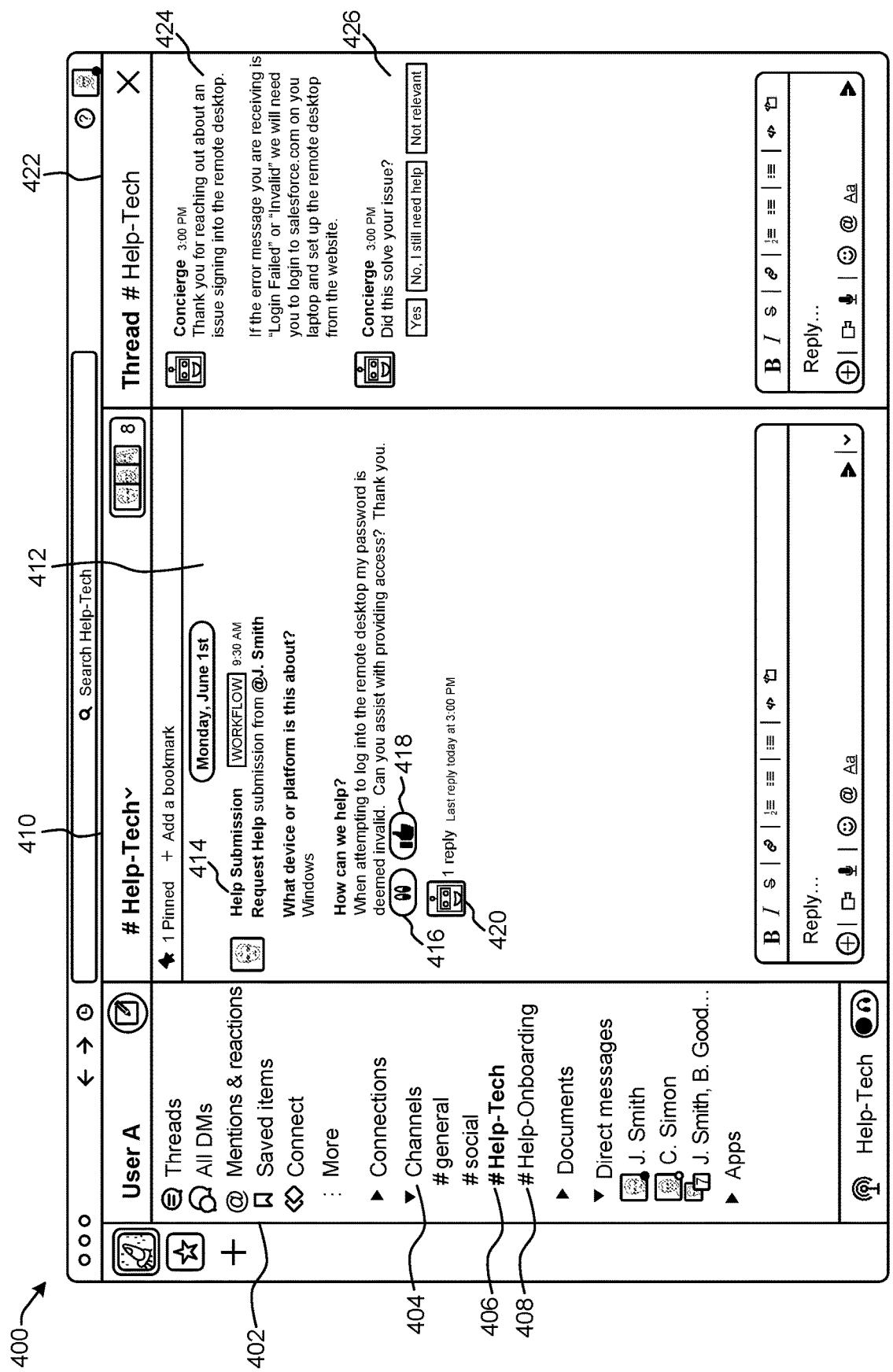
FIG. 4 illustrates an example user interface associated with a communication platform, as described herein, for viewing user requests and responses thereto.

FIG. 4 illustrates an example user interface 400 associated with a communication platform, as described herein, for viewing user requests and responses thereto.

In some examples, the example user interface 400 may be similar or identical to the example user interfaces of FIGS. 1-3B. As described above, the example user interface 400 may include a request posted by a user of the virtual space, as well as a response (e.g., to the user request) posted by the virtual space. In some examples, the example user interface 400 may include a navigation pane 402. As described above, the navigation pane 402 may present different data and/or options to a user. In some examples, the navigation pane 402 may include different graphical indicators which may be associated with a variety of virtual spaces, such as channels 404. The example user interface 400 may include any number of channels 404 which may be used to organize conversations between and amongst users according to topics. In some examples, the example user interface 400 may include channels 404 such as a general channel, a social channel, a help-tech channel 406, a help-onboarding channel 408, and/or any other similar channel. When a user selects a channel 404, a channel pane 410 may be presented. In some examples, the channel pane 410 can include access to content associated with the channel, in addition to enabling users to add other members, post content, and the like.

In some examples, the example user interface 400 may include a pane to view messages 412 that have been posted by one or more users associated with the virtual space. As shown in FIG. 4, the message viewing pane 412 may include a user request 414 (e.g., help submission) that has been submitted by J. Smith. The request 414 may indicate the device and/or platform for which help is needed, in addition to a general summary about the requested help. However, this is not intended to be limiting, user requests may include differing types of information based on the type of channel 404 within which the request has been made. For example, user requests within the help-onboarding channel 408 may include different questions and/or responses.

In some examples, the example user interface 400 may include on or more graphical identifiers. As shown in FIG. 4, the example user interface 400 may include a first graphical identifier 416 and a second graphical identifier 418. As shown in FIG. 4, the first graphical identifier 416 may be an emoji, and the second graphical identifier 418 may be an emoji. However, in other examples there may be additional or fewer graphical identifiers. In some examples, the channel 404 may post the first graphical identifier 416 and/or the second graphical identifier 418 in response to the channel 404 (e.g., the help-tech channel 406) associating the user request 414 with a particular topic, and subsequently associating the topic with a graphical identifier.

In some examples, the one or more graphical identifiers may trigger a response 420 to be displayed within the virtual space (e.g., the help-tech channel 406). As described above, administrative users may generate responses with information regarding a topic. Such responses may include instructions, answers, and/or any other similar information. In some examples, responses may be associated (e.g., linked) with specific graphical identifiers. Further, when the help-tech channel 406 displays the first graphical identifier 416, displaying the first graphical identifier 416 may trigger or cause the associating response to be displayed to the help-tech channel 406.

In some examples, the virtual space may cause a response to be presented to the virtual space. As illustrated in FIG. 4, the example user interface 400 includes a thread pane 422. As described above, the thread pane 422 may display any number of thread responses. As shown in FIG. 4, the thread pane 422 may include the content 424 of the response 420. In such examples, the content 424 of the response 420 may provide information (e.g., answers, instructions, etc.) to the user regarding the user's request 414.

In some examples, the thread pane 422 may also include a user feedback option 426. The user feedback option 426 may allow the user to provide feedback indicating whether the response was helpful and/or relevant. In such examples, the user feedback option 426 may be utilized to re-train the machine learning models. For example, if the user selects (e.g., from the user feedback option 426) that the content 424 of the response 420 solved the users issue (e.g., request), then the machine learning model may know that the topic was accurately selected. Further, if the user indicates that the content 424 of the response 420 was not helpful, that may indicate to the machine learning models that the correct topic was selected, but that the administrative user may need to update the content 424 to the response 420. Further, if the user indicates that the content 424 was not relevant, the machine learning models may know that the identified topic was not accurate.

Figure 5A:
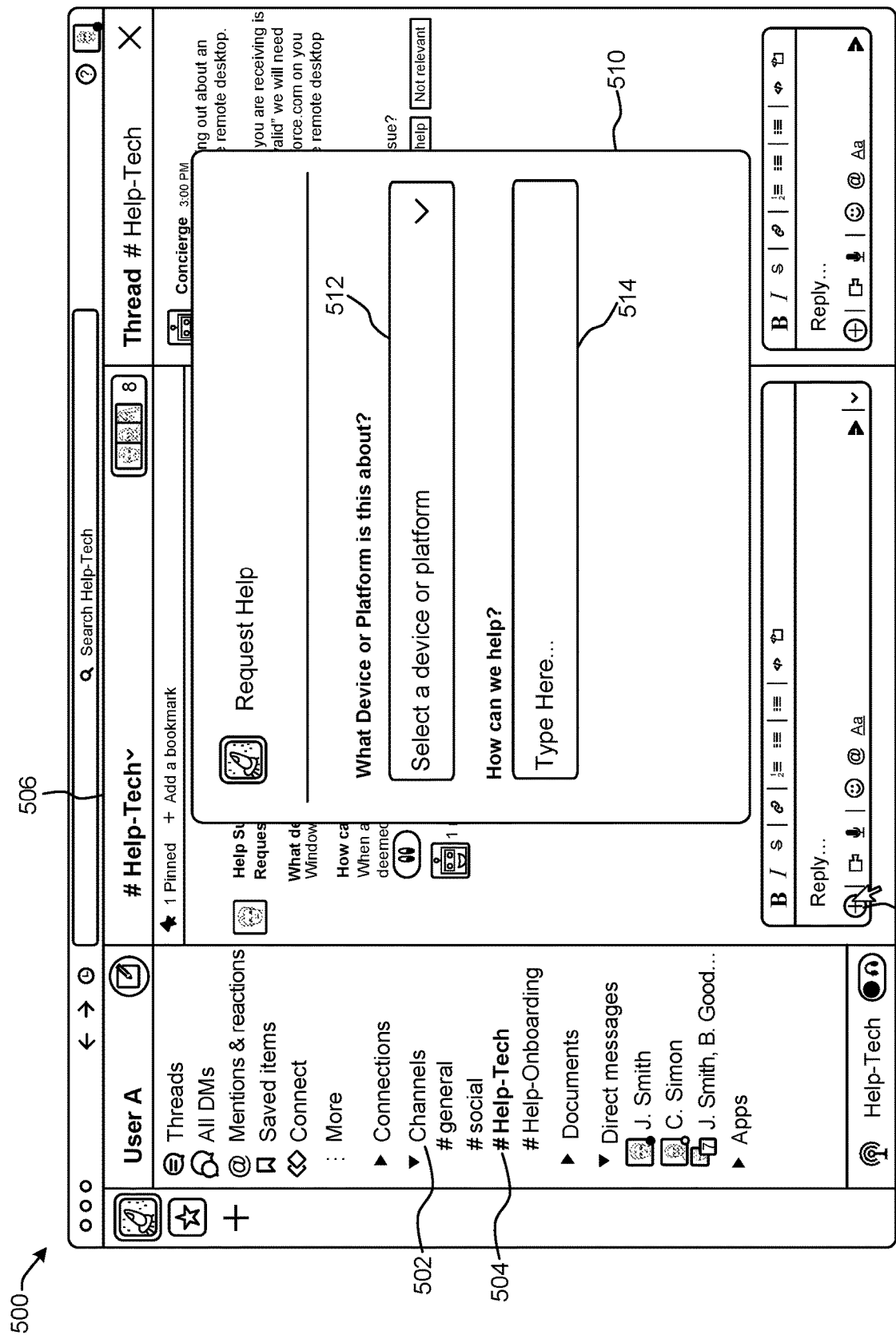
FIG. 5A illustrates an example user interface associated with a communication platform, as described herein, for allowing users to submit requests within a virtual space.

FIG. 5A illustrates an example user interface 500 associated with a communication platform, as described herein, for allowing users to submit requests within a virtual space.

As described above, the example user interface 500 may include a second user interface allowing users to submit requests. In some examples, the example user interface 500 may include one or more channels 502 within which users may communication amongst other users. Further, such channels 502 may include a general channel, a social channel, a help-tech channel 504, and/or a help-onboarding channel. In some examples, users may navigate from channel to channel based on the purpose of the communication, in addition to the desired recipients of the communication.

In some examples, the example user interface 500 may include a channel pane 506 within which users may read, post, and/or interact with messages. As illustrated in FIG. 5A, the channel pane 506 may be associated with the help-tech channel 504. In some examples, the help-tech channel 504 may include content related to helping users with technology. In some examples, user's of the help-tech channel 504 may compose and post questions (e.g., requests) to the help-tech channel 504. In such examples, users may submit requests to the help-tech channel 504 by posting the message directly to the help-tech channel 504. Alternatively or additionally, users may select an actuatable icon 508 which may be configured to display a second user interface 510 which may enable requesting users to submit questions (e.g., user requests) to the help-tech channel 504. In some examples, the second user interface 510 may include one or more text boxes, drop down boxes, and/or any other information obtaining objects. As shown in FIG. 5A, the second user interface 510 may include a drop down box 512 and a text box 514. In such examples, the user may compose responses to the drop down box 512 and the text box 514.

Figure 5B:
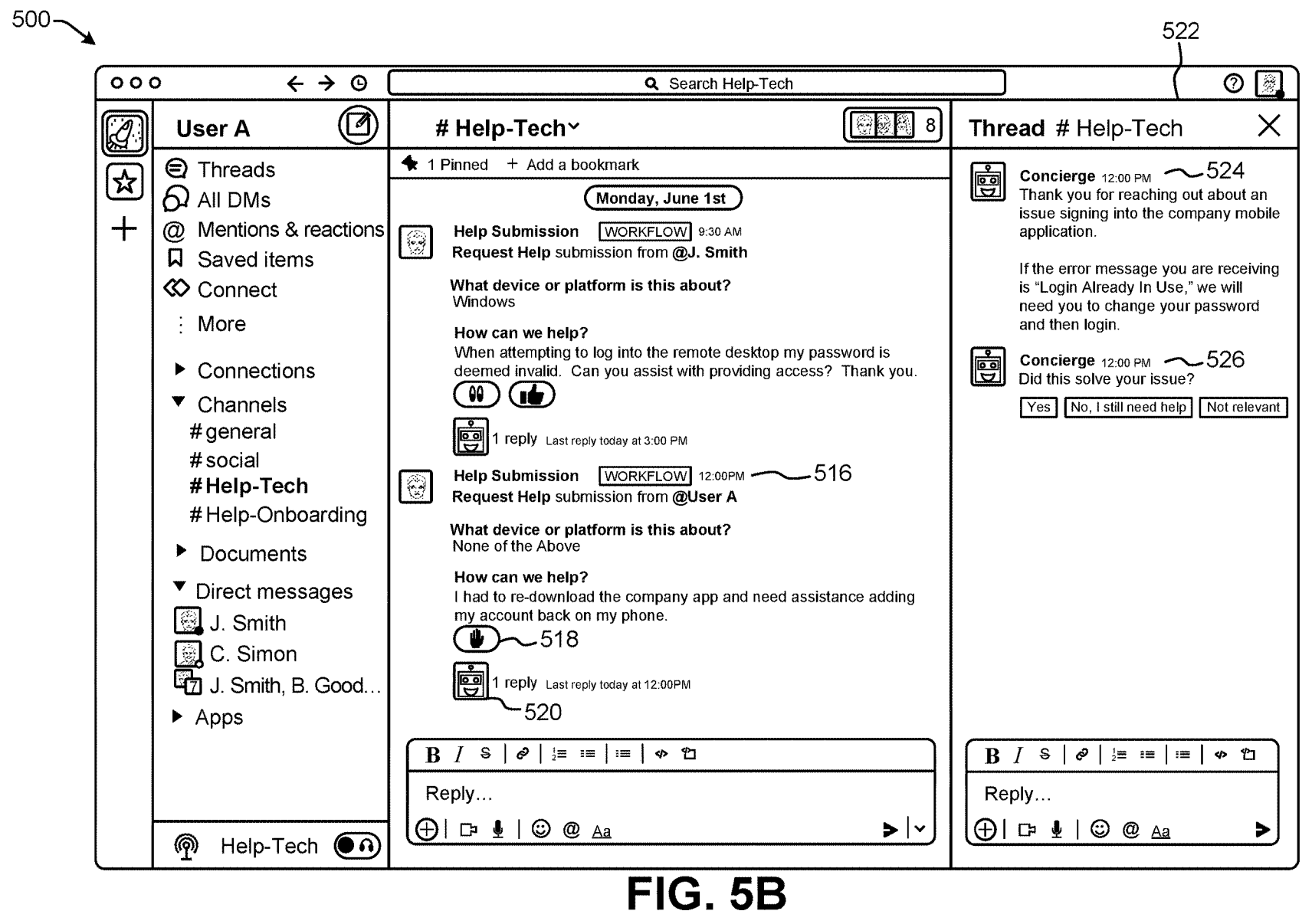

FIG. 5B illustrates an example user interface 500 associated with a communication platform, as described herein, for displaying user requests within a virtual space.

As described above, the example user interface 500 may include one or more user requests. In some examples, the example user interface 500 may receive and present the user request, as shown and discussed in FIG. 5A. In some examples, FIG. 5B illustrates what an example user interface 500 may look like after having received a request from a user. As described above, a user may submit a user request via the second user interface 510. Based on submitting the user request, the help-tech channel 504 may input the user request into a machine learning model to determine the topic of the user request. The machine learning model may output one or more topics with or without associated confidence levels. In some examples, the help-tech channel 504 may select an individual topic based on the confidence levels of the respective topics. Further, the help-tech channel 504 may display a graphical identifier that is associated with the individual topic. As shown in FIG. 5B, the help-tech channel 504 may display the user request 516 to the help-tech channel 504. Further, the help-tech channel 504 may determine that the graphical identifier 518 may be associated with the topic of the user request 516.

In some examples, the help-tech channel 504 may cause a response 520 to be displayed based on displaying the graphical identifier 518. As described above, administrative users may generate one or more responses which may provide information (e.g., answers, instructions, etc.) for user requests. In such examples, the one or more responses may be associated with graphical identifiers. For example, when the help-tech channel 504 displays the graphical identifier 518, the help-tech channel 504 may display the response 520 based on the response 520 being associated with the graphical identifier 518.

In some examples, the example user interface 500 which may include a thread pane 522. The thread pane 522 may include the content 524 of the response 520. In some examples, the content 524 of the response 520 may provide information (e.g., answers, instructions, etc.) to the user regarding the user's request 516. In some examples, the thread pane 522 may also include a user feedback option 526. As described above, the user feedback option 526 may allow the user to provide feedback indicating whether the response 520 was helpful and/or relevant. In such examples, the user feedback 526 may be utilized to re-train the machine learning models.

Figure 6:
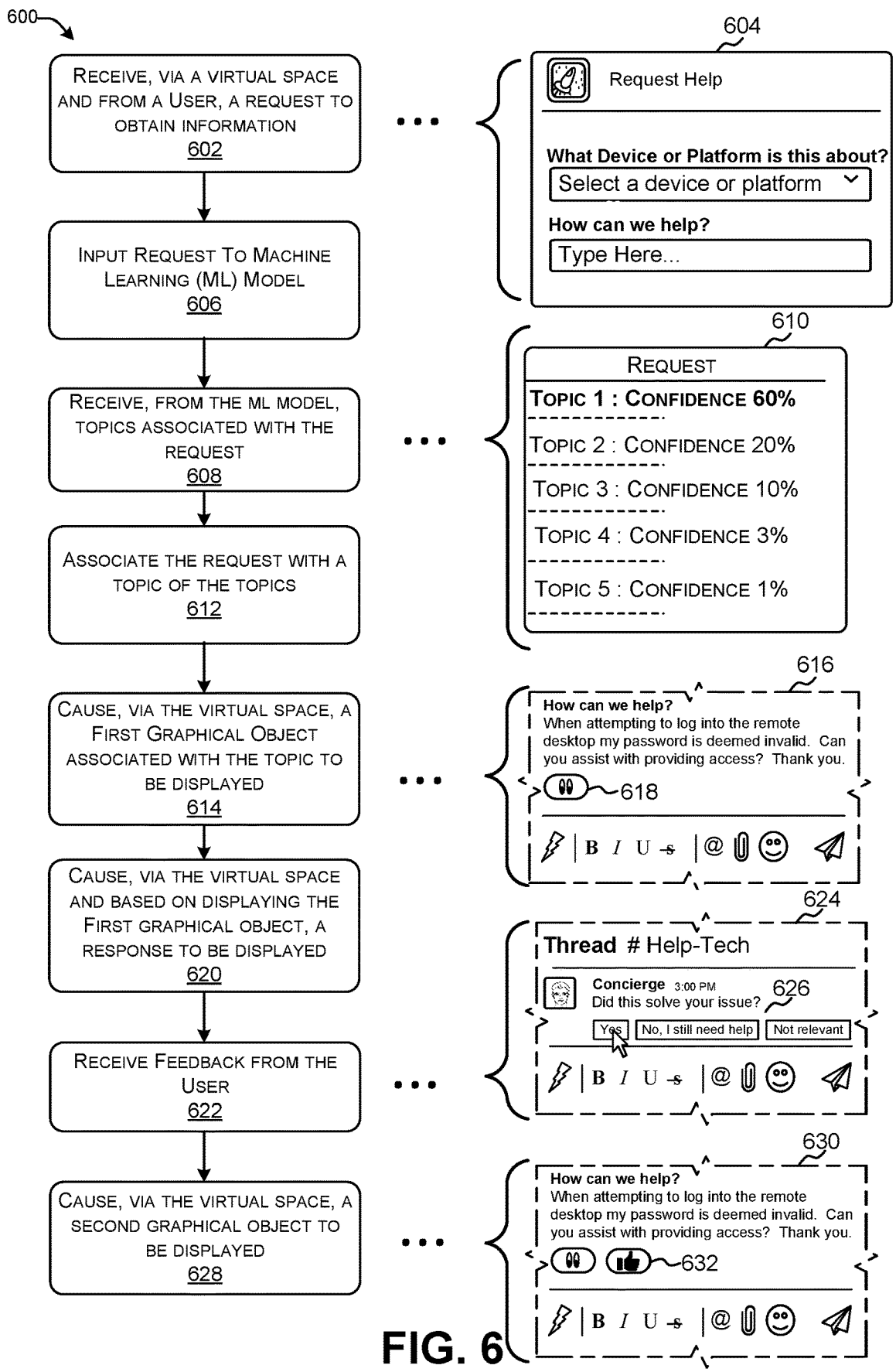
FIG. 6 is a pictorial flow diagram illustrating an example process for receiving user requests, receiving topics associated with the request, causing a graphical identifier to be displayed, and causing a response to be displayed based on the graphical identifier.

FIG. 6 is a pictorial flow diagram illustrating an example process 600 for receiving user requests, receiving topics associated with the request, causing a graphical identifier to be displayed, and causing a response to be displayed based on the graphical identifier. In some instances, some or all of process 600 may be performed by one or more components in the environment 100 or one or more components discussed with respect to FIGS. 2A-5B. However, the process 600 is not limited to being performed by components in the environment 100, and the components in the environment 100 are not limited to performing the processes 600. In addition, example user interfaces are also provided in FIG. 6 to help illustrate elements, and the process 600 is not limited to the aspects shown in the user interfaces.

Referring to FIG. 6, in at least some examples, at operation 602, the process 600 can include receiving, via a virtual space and from a user, a request to obtain information. As described above, users may submit (e.g., post) requests (e.g., questions) to virtual spaces. For example, a user may submit a request to the virtual space by using the user interface 604. In such examples, a user may compose questions within the user interface 604, and submit the questions to the virtual space.

In some examples, at operation 606, the process can include inputting the request to a machine learning model. As described above, machine learning models may be configured to receive user requests as input, and output topics associated with the user requests and confidence levels associated with the topics. In some examples, the machine learning model may utilize natural language processing to evaluate the user request. Using such natural language processing may enable the machine learning models to evaluate the text of the request and determine a topic associated therewith. Based on determining a number of topics that may be associated with the request, the machine learning model may determine a confidence level indicating the degree to which a topic is likely to be associated with the request. In some examples, the machine learning model may output the identified topics and the respective confidence levels to the virtual space of the communication platform.

In some examples, at operation 608, the process 600 can include receiving, from the machine learning model, topics associated with the user request. As described above, the virtual space may receive one or more topics and respective confidence levels from the machine learning model. For example, box 610 illustrates a plurality of topics with associating confidence levels. The virtual space may evaluate the topics and confidence levels in order to associate an individual topic with the user request.

In some examples, at operation 612, the process 600 can include associating the user request with an individual topic (e.g., indicating that the content of the user request is associated with the individual topic). In such examples, a virtual space may select a topic based on comparing the confidence levels of the numerous topics, and subsequently comparing the confidence levels to a threshold confidence level. For example, the virtual space may select the topic with the highest confidence level based on comparing the confidence levels of the one or more topics. As shown in box 610, the virtual space may select topic 1 based on determining that topic 1 has the highest confidence level compared to the other topics (e.g., topics 2-5). Based on selecting topic 1, the virtual space may compare the confidence level of topic 1 to a threshold confidence level. As described above, administrative users may determine a threshold confidence level. Based on the confidence level of the selected topic meeting or exceeding the threshold confidence level, the virtual space may associate the selected topic to the user request.

In some examples, at operation 614, the process 600 can include causing to display, via the virtual space, a first graphical identifier associated with the topic. As described above, the virtual space may include graphical identifiers (e.g., emojis) that are associated with various topics. For example, user interface 616 illustrates a user request with a graphical identifier 618. As such, based on the virtual space selecting a particular topic, the virtual space may display the graphical identifier 618 that is associated with the particular topic. Alternatively, if the virtual space does not have a graphical identifier associated with the selected topic, the virtual space may send the user request to an administrative user. In such examples, the administrative user may generate a graphical identifier and a response to the user request, which may be posted to the virtual space, and which may be used in future times.

In some examples, at operation 620, the process 600 can include causing display of, via the virtual space and based on displaying the graphical object, a response. As described above, administrative users may generate responses for user requests. Further, such responses may be associated with graphical identifiers. As such, when the graphical identifier 618 is displayed, the virtual space may display the response that is associated with the graphical identifier 618. Additionally or alternatively, based on performing the instructions provided within the response, the virtual space may direct the user to a remote third party service or a different first party service.

In some examples, at operation 622, the process 600 can include receiving feedback from the user. In addition to displaying the response, as discussed in operation 620, the virtual space may also display a user feedback option. The user feedback option allows the user to provide feedback to the virtual space regarding the effectiveness of the response. For example, user interface 624 illustrates a user feedback option 626. In some examples, the user feedback option 626 may include actuatable objects which may be used to convey the effectiveness of the response. For example, as shown in the user interface 624, the user feedback option 626 may ask whether the response solved the users issue (e.g., request).

In some examples, at operation 628, the process 600 can include causing to display, via the virtual space, a second graphical identifier. For example, user interface 630 illustrates a second graphical identifier 632 displayed proximate the user request. In some examples, the second graphical identifier 632 may be associated with the feedback provided by the user to the user feedback option 626. In some examples, the second graphical identifier 632 may indicate that the response was successful and that the user's request is now resolved. Alternatively, the second graphical identifier 632 may indicate that the response was unsuccessful and that further assistance is needed.

Figure 7:
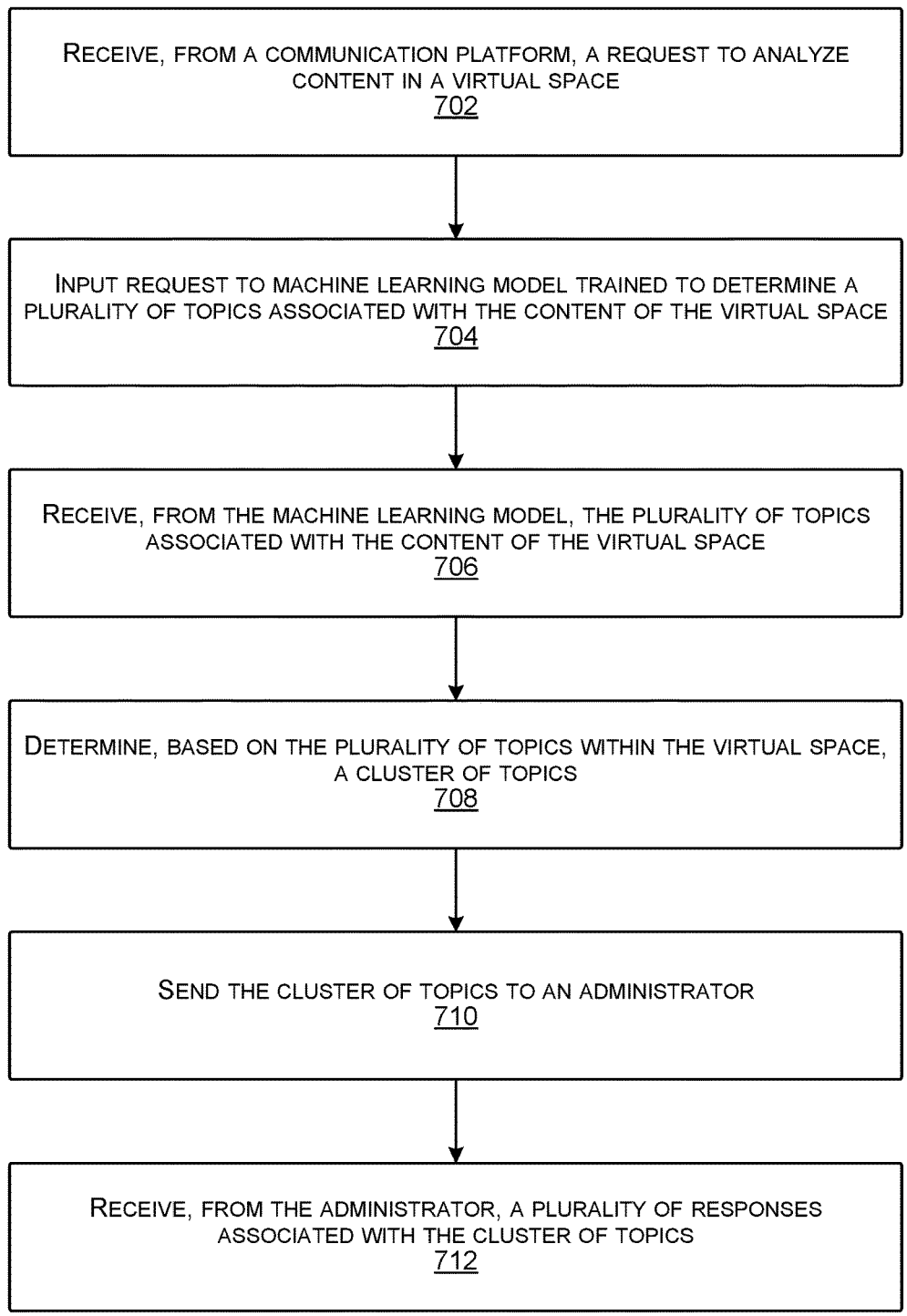
FIG. 7 is a flow diagram illustrating an example process of receiving a request to analyze content within a virtual space, receive a plurality of topics from a machine learning model, cluster the plurality of topics, and send the clustered topics to an administrative user.

FIG. 7 is a flow diagram illustrating an example process of receiving a request to analyze content within a virtual space, receiving a plurality of topics from a machine learning model, clustering the plurality of topics, and sending the clustered topics to an administrative user. The processes illustrated in FIG. 7 is described with reference to components described above with reference to the system 100 shown in FIG. 1 for convenience and ease of understanding. However, the processes illustrated in FIG. 7 is not limited to being performed using the components described above with reference to the system 100. Moreover, the components described above with reference to the system 100 are not limited to performing the processes illustrated in FIG. 7.

Process 700 is illustrated as collections of blocks in a logical flow diagram, representing sequences of operations, some or all of which can be implemented in hardware, software, or a combination thereof. In the context of software, the blocks represent computer-executable instructions stored on one or more computer-readable media that, when executed by one or more processors, perform the recited operations. Generally, computer-executable instructions include routines, programs, objects, components, encryption, deciphering, compressing, recording, data structures, and the like that perform particular functions or implement particular abstract data types. The order in which the operations are described should not be construed as a limitation. Any number of the described blocks can be combined in any order and/or in parallel to implement the processes, or alternative processes, and not all of the blocks need to be executed in all examples. For discussion purposes, the processes herein are described in reference to the frameworks, architectures and environments described in the examples herein, although the processes may be implemented in a wide variety of other frameworks, architectures or environments.

At operation 702, the process 700 can include receiving, from a communication platform, a request to analyze content in a virtual space. In some examples, a virtual space and/or administrative user may submit such a request based on a number of factors. Such factors may include how recently a virtual space was created, a frequency of use, number of pre-generated responses, and/or any other similar reason.

At operation 704, the process 700 can include inputting the request to a machine learning model trained to determine a plurality of topics associated with the content of the virtual space. In some examples, the machine learning model may evaluate and analyze the content (e.g., interaction data) within a virtual space. Further, the machine learning model may identify one or more topics associated with the content within the virtual space. In such examples, the machine learning model may output, to the virtual space, a plurality of topics.

At operation 706, the process 700 can include receiving, from the machine learning model, the plurality of topics associated with the content of the virtual space. As described above, the machine learning model may output any number of topics to the virtual space.

At operation 708, the process 700 can include determining, based on the plurality of topics within the virtual space, a cluster of topics. In some examples, the virtual space may cluster the topics based on any number of factors. For example, the plurality of topics may be clustered and/or prioritized based on the frequency with which a topic was posted to the virtual space, the number of times a topic was posted to the virtual space, the importance of the topic, etc. As such, the virtual space may determine a prioritized cluster of topics.

Alternatively or additionally, the machine learning model may perform the clustering and/or prioritizing functions. For example, the machine learning model may identify a plurality of topics within the virtual space, and subsequently cluster the plurality of topics based on a number of factors, as described above. In such examples, the machine learning model may output a cluster of topics to the administrative user.

At operation 710, the process 700 can include sending the cluster of topics to an administrative user. In some examples, administrative users may generate responses for user requests. However, in some situations, new issues may arise within a virtual space for which the administrative user has not generated a response. As such, the cluster of topics may provide a list of topics for which the administrative user can prepare and/or generate responses.

At operation 712, the process 700 may include receiving, from the administrative user, a plurality of responses associated with the cluster of topics. As described above, the administrative user may generate responses to some or all of the topics provided in the cluster of topics. In some examples, responses generated by the administrative user may be stored and used by the virtual space upon receiving user requests regarding the same or similar topic.

EXAMPLE CLAUSES

A: A method, implemented at least in part by one or more computing devices of a communication platform, the method comprising: receiving, via a virtual space and from a user associated with a user profile of the communication platform, a request to obtain information; inputting the request into a machine learning model trained to determine a plurality of topics associated with the request and respective confidence levels associated with the plurality of topics; receiving, from the machine learning model, the plurality of topics and the respective confidence levels; determining that an individual confidence level associated with an individual topic meets or exceeds a threshold confidence level; based least in part on the individual confidence level meeting or exceeding the threshold confidence level, associating the individual topic with the request; determining that the individual topic is associated with a graphical identifier; causing to display, based at least in part on the request being associated with the individual topic, the graphical identifier on the virtual space; and causing to display, based at least in part on the graphical identifier to be displayed, a workflow response on the virtual space.

B: The method of paragraph A, wherein the machine learning model is a first machine learning model and the virtual space is a first virtual space, further comprising: receiving, via a second virtual space and from a second user associated with a second user profile, a second request to obtain information, wherein the second virtual space is different from the first virtual space; inputting the second request into a second machine learning model trained to determine a second plurality of topics associated with the second request and second respective confidence levels associated with the second plurality of topics, wherein the second machine learning model is different than the first machine learning model; receiving, from the second machine learning model, the second plurality of topics and the second respective confidence levels; and causing to display, based at least in part on the second plurality of topics and the second respective confidence levels, a second workflow response to the second virtual space, wherein the second workflow response is different than the workflow response.

C: The method of paragraph A, wherein the individual topic is a first individual topic and the individual confidence level is a first individual confidence level, further comprising: determining, based at least in part on the request, that the first individual topic and a second individual topic are associated with the request; determining that the first individual topic is associated with the first individual confidence level and the second individual topic is associated with a second individual confidence level; and selecting, based at least in part on the first individual confidence level exceeding the second individual confidence level, the first individual topic.

D: The method of paragraph A, wherein the graphical identifier is a first graphical identifier, further comprising: receiving, via the virtual space and from the user, an indication of performance of the user; and causing to display, based at least in part on the indication of performance, a second graphical identifier to the virtual space, wherein the second graphical identifier is different than the first graphical identifier.

E: The method of paragraph A, wherein the request comprises a question associated with the virtual space and the machine learning model comprises a natural language processing component.

F: The method of paragraph A, wherein the machine learning model is trained based at least in part on: first interaction data comprising prior topics associated with prior user requests; and second interaction data comprising prior confidence levels associated with the prior topics, to learn relationships between the first interaction data and the second interaction data, wherein the machine learning model is configured to use the learned relationships to generate the plurality of topics associated with the request and the respective confidence levels associated with the plurality of topics.

G: The method of paragraph A, wherein the virtual space comprises a channel, a thread, or a board.

H: The method of paragraph A, wherein the workflow response comprises a second request to access a first party resource associated with the communication platform or a remote third-party resource.

I: A system comprising: one or more processors; and one or more non-transitory computer-readable media storing instructions that, when executed by the one or more processors, cause the system to perform operations comprising: receiving, via a virtual space and from a user associated with a user profile, a request to obtain information; inputting the request into a machine learning model trained to determine that a topic is associated with the request; receiving, from the machine learning model, an output; based at least in part on the output, associating the request with the topic; determining that the topic is associated with a graphical identifier; causing to display, based at least in part on the request being associated with the topic, the graphical identifier to the virtual space; and causing to display, based at least in part on the graphical identifier to be displayed, a response to the virtual space.

J: The system of paragraph I, wherein the machine learning model is a first machine learning model, the virtual space is a first virtual space, and the response is a first workflow response, the operations further comprising: receiving, via a second virtual space and from a second user associated with a second user profile, a second request to obtain information, wherein the second virtual space is different from the first virtual space; inputting the second request into a second machine learning model trained to determine a second plurality of topics associated with the second request, wherein the second machine learning model is different than the first machine learning model; receiving, from the second machine learning model, the second plurality of topics; and causing to display, based at least in part on the second plurality of topics, a second workflow response to be displayed to the second virtual space, wherein the second workflow response is different than the workflow response.

K: The system of paragraph I, wherein the topic is a first topic, the operations further comprising: determining, based at least in part on the output, a first confidence level associated with the first topic; determining, based at least in part on the request, that the first topic and a second topic are associated with the request; determining that the first topic is associated with the first confidence level and the second topic is associated with a second confidence level; and selecting, based at least in part on the first confidence level exceeding the second confidence level, the first topic.

L: The system of paragraph I, wherein the graphical identifier is a first graphical identifier, the operations further comprising: receiving, via the virtual space and from the user, an indication of performance of the user; and causing to display, based at least in part on the indication of performance, a second graphical identifier to the virtual space, wherein the second graphical identifier is different than the first graphical identifier.

M: The system of paragraph I, wherein the machine learning model is trained based at least in part on: first interaction data comprising prior topics associated with prior user requests; and second interaction data comprising prior confidence levels associated with the prior topics, to learn relationships between the first interaction data and the second interaction data, wherein the machine learning model is configured to use the learned relationships to generate the topic associated with the request and a respective confidence level associated with the topic.

N: The system of paragraph I, wherein the virtual space comprises a channel, a thread, or a board.

O: One or more non-transitory computer-readable media storing instructions that, when executed, cause one or more processors to: receiving, via a virtual space and from a user associated with a user profile, a request to obtain information; inputting the request into a machine learning model trained to determine that a topic is associated with the request; receiving, from the machine learning model, an output; based at least in part on the output, associating the request with the topic; determining that the topic is associated with a graphical identifier; causing to display, based at least in part on the request being associated with the topic, the graphical identifier to the virtual space; and causing to display, based at least in part on the graphical identifier to be displayed, a response to the virtual space.

P: The one or more non-transitory computer-readable media of paragraph O, wherein the machine learning model is a first machine learning model, the virtual space is a first virtual space, and the response is a first workflow response, further comprising: receiving, via a second virtual space and from a second user associated with a second user profile, a second request to obtain information, wherein the second virtual space is different from the first virtual space; inputting the second request into a second machine learning model trained to determine a second plurality of topics associated with the second request, wherein the second machine learning model is different than the first machine learning model; receiving, from the second machine learning model, the second plurality of topics; and causing to display, based at least in part on the second plurality of topics, a second workflow response to be displayed to the second virtual space, wherein the second workflow response is different than the workflow response.

Q: The one or more non-transitory computer-readable media of paragraph O, wherein the topic is a first topic, further comprising: determining, based at least in part on the output, a first confidence level associated with the first topic; determining, based at least in part on the request, that the first topic and a second topic are associated with the request; determining that the first topic is associated with the first confidence level and the second topic is associated with a second confidence level; and selecting, based at least in part on the first confidence level exceeding the second confidence level, the first topic.

R: The one or more non-transitory computer-readable media of paragraph O, wherein the graphical identifier is a first graphical identifier, further comprising: receiving, via the virtual space and from the user, an indication of performance of the user; and causing to display, based at least in part on the indication of performance, a second graphical identifier to the virtual space, wherein the second graphical identifier is different than the first graphical identifier.

S: The one or more non-transitory computer-readable media of paragraph O, wherein the machine learning model is trained based at least in part on: first interaction data comprising prior topics associated with prior user requests; and second interaction data comprising prior confidence levels associated with the prior topics, to learn relationships between the first interaction data and the second interaction data, wherein the machine learning model is configured to use the learned relationships to generate the topic associated with the request and a respective confidence level associated with the topic.

T: The one or more non-transitory computer-readable media of paragraph O, wherein the virtual space comprises a channel, a thread, or a board.

While the example clauses described above are described with respect to one particular implementation, it should be understood that, in the context of this document, the content of the example clauses can also be implemented via a method, device, system, a computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A method, implemented at least in part by one or more computing devices of a communication platform, the method comprising:
   receiving, via a virtual space and from a user associated with a user profile of the communication platform, a request to obtain information;
   inputting the request into a trained machine learning model trained to determine a plurality of topics associated with the request and respective confidence levels associated with the plurality of topics, wherein the trained machine learning model is trained on content stored within the virtual space;
   receiving, from the trained machine learning model, the plurality of topics and the respective confidence levels;
   determining that an individual confidence level associated with an individual topic is a highest confidence level of the respective confidence levels;
   determining, based at least in part on the individual confidence level being the highest confidence level, that the individual confidence level meets or exceeds a threshold confidence level;
   based least in part on the individual confidence level meeting or exceeding the threshold confidence level, associating the individual topic with the request;
   determining that the individual topic of the request corresponds to a graphical identifier;
   causing to display, in response to determining that the individual topic corresponds to the graphical identifier and based at least in part on the request being associated with the individual topic, the graphical identifier on the virtual space; and
   causing to display, based at least in part on the graphical identifier to be displayed, a workflow response on the virtual space.

2. The method of claim 1, wherein the trained machine learning model is a first trained machine learning model and the virtual space is a first virtual space, further comprising:
   receiving, via a second virtual space and from a second user associated with a second user profile, a second request to obtain information, wherein the second virtual space is different from the first virtual space;
   inputting the second request into a second trained machine learning model trained to determine a second plurality of topics associated with the second request and second respective confidence levels associated with the second plurality of topics, wherein the second trained machine learning model is different than the first trained machine learning model;
   receiving, from the second trained machine learning model, the second plurality of topics and the second respective confidence levels; and
   causing to display, based at least in part on the second plurality of topics and the second respective confidence levels, a second workflow response to the second virtual space, wherein the second workflow response is different than the workflow response.

3. The method of claim 1, wherein the individual topic is a first individual topic and the individual confidence level is a first individual confidence level, further comprising:
   determining, based at least in part on the request, that the first individual topic and a second individual topic are associated with the request;
   determining that the first individual topic is associated with the first individual confidence level and the second individual topic is associated with a second individual confidence level; and
   selecting, based at least in part on the first individual confidence level exceeding the second individual confidence level, the first individual topic.

4. The method of claim 1, wherein the graphical identifier is a first graphical identifier, further comprising:
   receiving, via the virtual space and from the user, an indication of performance of the user; and
   causing to display, based at least in part on the indication of performance, a second graphical identifier to the virtual space, wherein the second graphical identifier is different than the first graphical identifier.

5. The method of claim 1, wherein the request comprises a question associated with the virtual space and the trained machine learning model comprises a natural language processing component.

6. The method of claim 1, wherein the trained machine learning model is trained based at least in part on:
   first interaction data comprising prior topics associated with prior user requests; and
   second interaction data comprising prior confidence levels associated with the prior topics, to learn relationships between the first interaction data and the second interaction data, wherein the trained machine learning model is configured to use the learned relationships to generate the plurality of topics associated with the request and the respective confidence levels associated with the plurality of topics.

7. The method of claim 1, wherein the virtual space comprises a channel, a thread, or a board.

8. The method of claim 1, wherein the workflow response comprises a second request to access a first party resource associated with the communication platform or a remote third-party resource.

9. A system comprising:
   one or more processors; and
   one or more non-transitory computer-readable media storing instructions that, when executed by the one or more processors, cause the system to perform operations comprising:
      receiving, via a virtual space and from a user associated with a user profile, a request to obtain information;
      inputting the request into a trained machine learning model trained to determine that a topic is associated with the request, wherein the trained machine learning model is trained on content stored within the virtual space;
      receiving, from the trained machine learning model, an output that includes a plurality of confidence levels;
      determining that a confidence level of the plurality of confidence levels is a highest confidence level;
      determining, based at least in part on the confidence level being the highest confidence level, that the confidence level meets or exceeds a threshold confidence level;
      based at least in part on the output and the confidence level meeting or exceeding the threshold confidence level, associating the request with the topic;

determining that the topic of the request corresponds to a graphical identifier;

causing to display, in response to determining that the topic corresponds to the graphical identifier and based at least in part on the request being associated with the topic, the graphical identifier to the virtual space; and causing to display, based at least in part on the graphical identifier to be displayed, a response to the virtual space.

10. The system of claim 9, wherein the trained machine learning model is a first trained machine learning model, the virtual space is a first virtual space, and the response is a first workflow response, the operations further comprising:

receiving, via a second virtual space and from a second user associated with a second user profile, a second request to obtain information, wherein the second virtual space is different from the first virtual space;

inputting the second request into a second trained machine learning model trained to determine a second plurality of topics associated with the second request, wherein the second trained machine learning model is different than the first trained machine learning model;

receiving, from the second trained machine learning model, the second plurality of topics; and causing to display, based at least in part on the second plurality of topics, a second workflow response to be displayed to the second virtual space, wherein the second workflow response is different than the first workflow response.

11. The system of claim 9, wherein the topic is a first topic, the operations further comprising:

determining, based at least in part on the output, a first confidence level associated with the first topic;

determining, based at least in part on the request, that the first topic and a second topic are associated with the request;

determining that the first topic is associated with the first confidence level and the second topic is associated with a second confidence level; and selecting, based at least in part on the first confidence level exceeding the second confidence level, the first topic.

12. The system of claim 9, wherein the graphical identifier is a first graphical identifier, the operations further comprising:

receiving, via the virtual space and from the user, an indication of performance of the user; and causing to display, based at least in part on the indication of performance, a second graphical identifier to the virtual space, wherein the second graphical identifier is different than the first graphical identifier.

13. The system of claim 9, wherein the trained machine learning model is trained based at least in part on:

first interaction data comprising prior topics associated with prior user requests; and second interaction data comprising prior confidence levels associated with the prior topics, to learn relationships between the first interaction data and the second interaction data, wherein the trained machine learning model is configured to use the learned relationships to generate the topic associated with the request and a respective confidence level associated with the topic.

14. The system of claim 9, wherein the virtual space comprises a channel, a thread, or a board.

15. One or more non-transitory computer-readable media storing instructions that, when executed, cause one or more processors to:

receiving, via a virtual space and from a user associated with a user profile, a request to obtain information;

inputting the request into a trained machine learning model trained to determine that a topic is associated with the request, wherein the trained machine learning model is trained on content stored within the virtual space;

receiving, from the trained machine learning model, an output that includes a plurality of confidence levels;

determining that a confidence level of the plurality of confidence levels is a highest confidence level;

determining, based at least in part on the confidence level being the highest confidence level, that the confidence level meets or exceeds a threshold confidence level;

based at least in part on the output and the confidence level meeting or exceeding the threshold confidence level, associating the request with the topic;

determining that the topic of the request corresponds to a graphical identifier;

causing to display, in response to determining that the topic corresponds to the graphical identifier and based at least in part on the request being associated with the topic, the graphical identifier to the virtual space; and causing to display, in response to displaying the graphical identifier and in response to identifying a response associated with the graphical identifier, the response to the virtual space.

16. The one or more non-transitory computer-readable media of claim 15, wherein the trained machine learning model is a first trained machine learning model, the virtual space is a first virtual space, and the response is a first workflow response, further comprising:

receiving, via a second virtual space and from a second user associated with a second user profile, a second request to obtain information, wherein the second virtual space is different from the first virtual space;

inputting the second request into a second trained machine learning model trained to determine a second plurality of topics associated with the second request, wherein the second trained machine learning model is different than the first trained machine learning model;

receiving, from the second trained machine learning model, the second plurality of topics; and causing to display, based at least in part on the second plurality of topics, a second workflow response to be displayed to the second virtual space, wherein the second workflow response is different than the first workflow response.

17. The one or more non-transitory computer-readable media of claim 15, wherein the topic is a first topic, further comprising:

determining, based at least in part on the output, a first confidence level associated with the first topic;

determining, based at least in part on the request, that the first topic and a second topic are associated with the request;

determining that the first topic is associated with the first confidence level and the second topic is associated with a second confidence level; and selecting, based at least in part on the first confidence level exceeding the second confidence level, the first topic.

18. The one or more non-transitory computer-readable media of claim 15, wherein the graphical identifier is a first graphical identifier, further comprising:
- receiving, via the virtual space and from the user, an indication of performance of the user; and
- causing to display, based at least in part on the indication of performance, a second graphical identifier to the virtual space, wherein the second graphical identifier is different than the first graphical identifier.

19. The one or more non-transitory computer-readable media of claim 15, wherein the trained machine learning model is trained based at least in part on:
- first interaction data comprising prior topics associated with prior user requests; and
- second interaction data comprising prior confidence levels associated with the prior topics, to learn relationships between the first interaction data and the second interaction data, wherein the trained machine learning model is configured to use the learned relationships to generate the topic associated with the request and a respective confidence level associated with the topic.

20. The one or more non-transitory computer-readable media of claim 15, wherein the virtual space comprises a channel, a thread, or a board.

* * * * *